(12) United States Patent
Kawanishi et al.

(10) Patent No.: US 10,393,515 B2
(45) Date of Patent: Aug. 27, 2019

(54) THREE-DIMENSIONAL SCANNER AND MEASUREMENT ASSISTANCE PROCESSING METHOD FOR SAME

(71) Applicant: MITSUBISHI ELECTRIC CORPORATION, Chiyoda-ku (JP)

(72) Inventors: Ryosuke Kawanishi, Chiyoda-ku (JP); Makito Seki, Chiyoda-ku (JP); Keisuke Sambongi, Chiyoda-ku (JP); Yu Enomoto, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/070,025

(22) PCT Filed: Jan. 20, 2016

(86) PCT No.: PCT/JP2016/051598
§ 371 (c)(1),
(2) Date: Jul. 13, 2018

(87) PCT Pub. No.: WO2017/126060
PCT Pub. Date: Jul. 27, 2017

(65) Prior Publication Data
US 2019/0049240 A1 Feb. 14, 2019

(51) Int. Cl.
G01B 11/25 (2006.01)
G01C 3/06 (2006.01)
(Continued)

(52) U.S. Cl.
CPC .......... G01B 11/2513 (2013.01); G01C 3/06 (2013.01); G01C 15/00 (2013.01); G01S 7/4808 (2013.01); G01S 17/89 (2013.01); G01S 17/58 (2013.01)

(58) Field of Classification Search
CPC ...... G01B 11/2513; G01C 3/06; G01C 15/00; G01S 7/4808; G01S 17/89
(Continued)

(56) References Cited

U.S. PATENT DOCUMENTS 9,183,631 B2    11/2015  Taguchi et al.
2017/0140539 A1*  5/2017  Wang ................ B25J 9/1687

FOREIGN PATENT DOCUMENTS

JP    2009-155056 A    7/2009
JP    5310285 B2      10/2013
JP    2015-515655 A    5/2015

OTHER PUBLICATIONS

International Search Report dated Apr. 5, 2016 in PCT/JP2016/051598 filed Jan. 20, 2016.
(Continued)

Primary Examiner — Roy M Punnoose
(74) Attorney, Agent, or Firm — Oblon, McClelland, Maier & Neustadt, L.L.P.

(57) ABSTRACT

In a three-dimensional scanner, a scanner main body calculates the position and direction of a depth sensor. The scanner main body also determines a movement candidate, which is a candidate for a position and direction to/in which the depth sensor is to be moved next. Then, the scanner main body acquires a feature within the movement candidate, which is the feature observable by the depth sensor from the movement candidate, and evaluates the stability of mapping performed from the movement candidate through use of the feature within the movement candidate. The scanner main body further presents at least any one of the moving direction or moving speed of the depth sensor to a user based on an evaluation result.

17 Claims, 22 Drawing Sheets

(51) Int. Cl.
*G01C 15/00* (2006.01)
*G01S 17/89* (2006.01)
*G01S 7/48* (2006.01)
*G01S 17/58* (2006.01)

(58) Field of Classification Search
USPC .......................................................... 356/610
See application file for complete search history.

(56) References Cited

OTHER PUBLICATIONS

Taguchi, Y. et al., "Point-Plane SLAM for Hand-Held 3D Sensors," IEEE International Conference on Robotics and Automation (ICRA), Mitsubishi Electric Research Laboratories, May 2013, 9 Pages.

* cited by examiner

× VISUAL FEATURE

THREE-DIMENSIONAL SCANNER AND MEASUREMENT ASSISTANCE PROCESSING METHOD FOR SAME

TECHNICAL FIELD

The present invention relates to: a three-dimensional scanner configured to measure the dimensions of a three-dimensional space, for example, a production site and an elevator shaft, to create a three-dimensional map thereof; and a measurement assistance processing method for the three-dimensional scanner.

BACKGROUND ART

In, for example, a production site and an elevator shaft, it is required to measure the dimensions of the working environment being a three-dimensional space for installation or maintenance of equipment. However, it is difficult to manually measure a three-dimensional space, and this difficulty frequently causes skipping of the measurement of a part or causes an error in some measured values. In such a case, correction in design, reprocessing of a member, or other such measure is required, which leads to a delay in work.

In addition, when an object of interest is owned by a customer, in order to remeasure the dimensions, it is required to again request the customer to stop the object at the site (for example, stop production or stop operating an elevator).

Against this backdrop, there has been a demand for measuring (scanning) the shape of a three-dimensional space in a simple manner and storing the three-dimensional shape, to thereby enable the dimensions of every part to be measured at any time and also enable a simulation of the installation to be verified.

As one method of acquiring the shape of the three-dimensional space, there is a method of manually scanning through use of a three-dimensional (3D) sensor. In this case, a feature is extracted from each of a plurality of pieces of measurement data. Then, the pieces of measurement data are subjected to registration so that the features observed in common between the pieces of measurement data overlap each other, to thereby create (update) a three-dimensional map. Such processing for the registration of pieces of data is called mapping.

In a related-art image processing device, a control unit includes a three-dimensional map generation unit. The three-dimensional map generation unit moves a camera and generates a partial three-dimensional map based on two two-dimensional images picked up at two spots. In addition, the control unit causes the camera to perform photographing from each of different spots on a guide rail, and generates and stores an entire three-dimensional map from the acquired image. Further, the control unit derives, based on the stored entire three-dimensional map, a spot from which a freely-selected image pickup target spot can be viewed without an obstruction. Then, in the vicinity of the derived spot, the control unit causes the camera to continue to pick up an image until a three-dimensional map including the image pickup target spot can be generated, and to generate the three-dimensional map of the part to acquire the three-dimensional map of the image target spot (see, for example, Patent Literature 1).

In another case, in a related-art self-position estimating method, a self position is estimated by detecting a feature point in an image picked up by an image capture device mounted to a mobile body and detecting the position of an object in the periphery of the mobile body from a change of the feature point on the image in accordance with the movement of the mobile body. At this time, when the mobile body is not rotating on the spot, the image pickup direction of the image capture device is set as an initial direction. Meanwhile, when the mobile body is rotating on the spot, the image pickup direction of the image capture device is set to be a direction that enables the pickup of at least a part of feature points existing in the image acquired before the mobile body rotates. With this setting, it is possible to reduce a probability of losing a feature point, and to continuously carry out self localization estimation (see, for example, Patent Literature 2).

CITATION LIST

Patent Literature

[PTL 1] JP 2009-155056 A
[PTL 2] JP 5310285 B2

SUMMARY OF INVENTION

Technical Problem

In the related-art image processing device described in Patent Literature 1, the stability of the mapping is evaluated after the movement of the camera, and it is required to determine an optimum point of view by trial and error.

In addition, in the related-art self-position estimating method described in Patent Literature 2, the stability of the mapping is not evaluated, and hence there is a fear that accuracy may deteriorate depending on a sensor route.

The present invention has been made in order to solve the above-mentioned problems, and has an object to obtain a three-dimensional scanner and a measurement assistance processing method for the three-dimensional scanner, which are capable of creating a three-dimensional map more smoothly with higher accuracy.

Solution to Problem

According to one embodiment of the present invention, there is provided a three-dimensional scanner including: a depth sensor capable of acquiring measurement data on a distance to a measurement target as a set of points in a three-dimensional space; and a scanner main body configured to: extract features from a plurality of pieces of measurement data acquired by the depth sensor; and create a three-dimensional map by superimposing the extracted features on one another, wherein the scanner main body is configured to: calculate a position and direction of the depth sensor; determine a movement candidate, which is a candidate for a position and direction to/in which the depth sensor is to be moved next; acquire a feature within the movement candidate, which is the feature observable by the depth sensor from the movement candidate; evaluate stability of mapping performed from the movement candidate through use of the feature within the movement candidate; and present at least any one of a moving direction or moving speed of the depth sensor to a user based on an evaluation result.

Further, according to one embodiment of the present invention, there is provided measurement assistance processing method for a three-dimensional scanner, the three-dimensional scanner including: a depth sensor capable of acquiring measurement data on a distance to a measurement target as a set of points in a three-dimensional space; and a scanner main body configured to: extract features from a plurality of pieces of measurement data acquired by the depth sensor; and create a three-dimensional map by superimposing the extracted features on one another, the measurement assistance processing method being a processing method for assisting three-dimensional measurement by the scanner main body of the three-dimensional scanner, the measurement assistance processing method including the steps of: calculating a position and direction of the depth sensor; determining a movement candidate, which is a candidate for a position and direction to/in which the depth sensor is to be moved next; acquiring a feature within the movement candidate, which is the feature observable by the depth sensor from the movement candidate; evaluating stability of mapping performed from the movement candidate through use of the feature within the movement candidate; and presenting at least any one of a moving direction or moving speed of the depth sensor to a user based on an evaluation result.

Advantageous Effects of Invention

In the three-dimensional scanner and the measurement assistance processing method for the same according to the present invention, at least anyone of the moving direction or moving speed of the depth sensor is presented to the user based on a result of evaluating the stability of the mapping, and hence it is possible to create the three-dimensional map more smoothly with higher accuracy.

DESCRIPTION OF EMBODIMENTS

Figure 1:
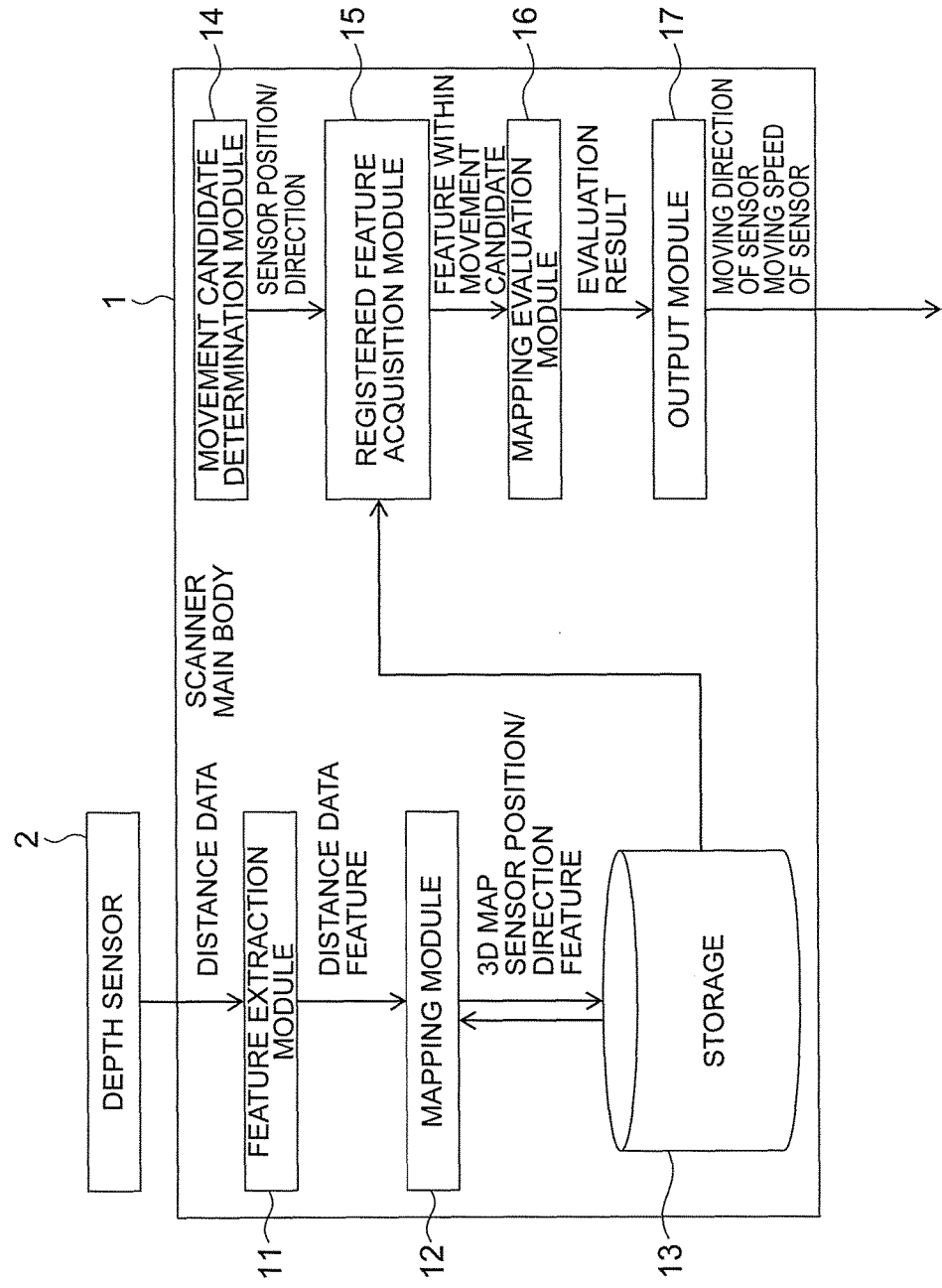
FIG. 1 is a block diagram for illustrating a three-dimensional scanner according to a first embodiment of the present invention.

Now, the modes for carrying out the present invention are described referring to the drawings.

First Embodiment

FIG. 1 is a block diagram for illustrating a three-dimensional scanner according to a first embodiment of the present invention. In FIG. 1, the three-dimensional scanner includes a scanner main body 1 and a depth sensor 2 connected to the scanner main body 1.

The depth sensor 2 is a sensor capable of acquiring distance data, which is measurement data on a distance to a measurement target, as a set (three-dimensional point cloud) of points in a three-dimensional space. As a method of measuring the distance, it is possible to use various methods, for example, a time-of-flight (ToF) method and an active stereo method, which uses pattern projection performed by a system using a projector and a camera.

The depth sensor 2 may be manually moved by a user while being held by hand, or may be mounted to a carriage or the like so that measurement is performed by moving the carriage. The distance can be measured at a timing at which the user inputs an instruction, or can be automatically measured at every time interval set in advance.

The scanner main body 1 can be formed of a computer including an arithmetic processing unit (CPU), a storage (including a ROM, a RAM, and a hard disk drive), and a signal input/output module. The scanner main body 1 has functions implemented by the computer. That is, a program for implementing the functions of the scanner main body 1 is stored in the storage of the computer. For example, a tablet PC (slate personal computer) can be used as the computer that forms the scanner main body 1.

Figure 2:
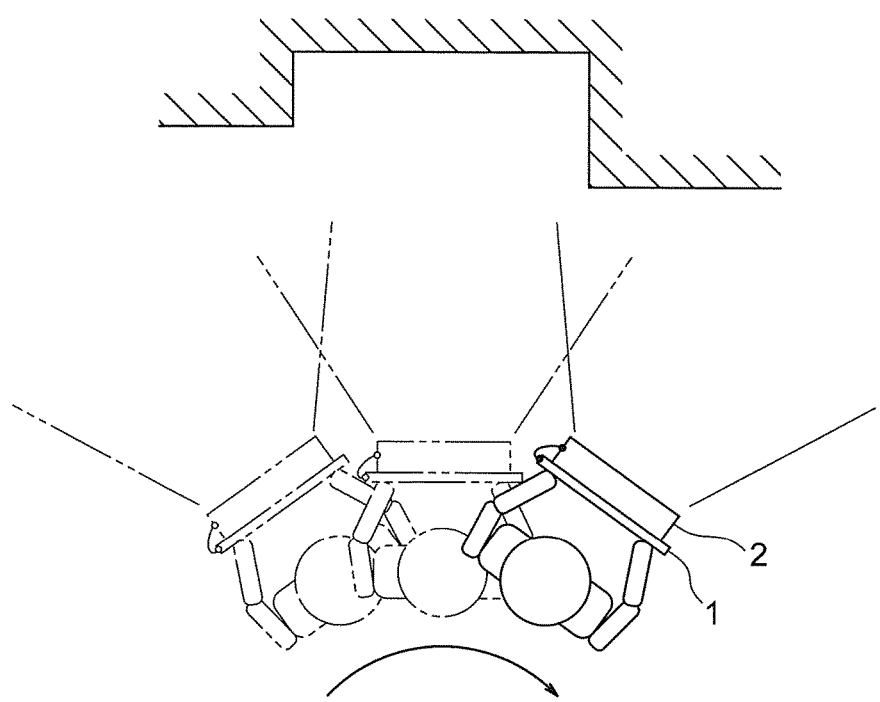
FIG. 2 is a plan view for illustrating how a user scans a measurement target by the three-dimensional scanner according to the first embodiment to create a three-dimensional map.
Figure 3:
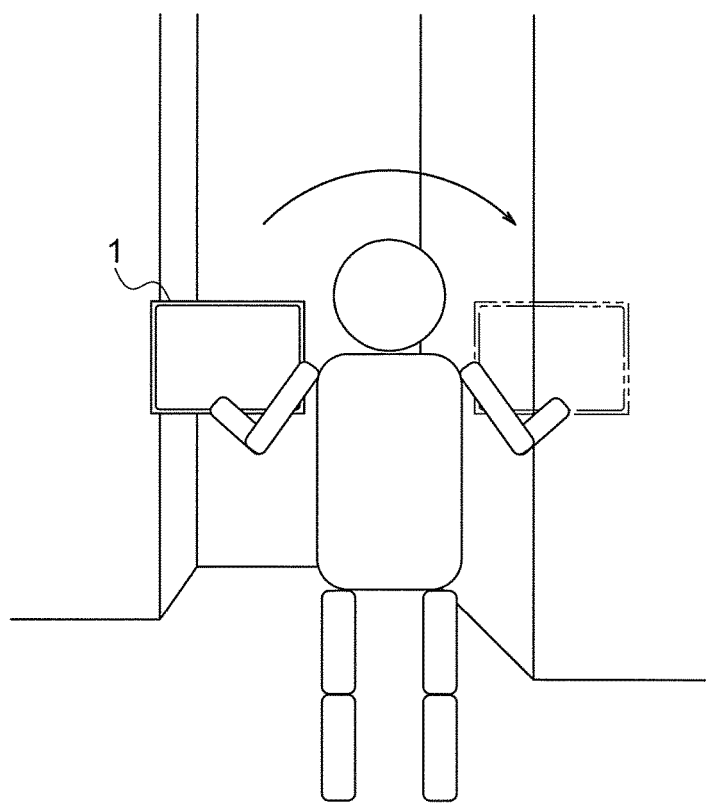
FIG. 3 is a view of a state of work illustrated in FIG. 2, which is viewed from behind the user.

FIG. 2 is a plan view for illustrating how the user scans the measurement target by the three-dimensional scanner according to the first embodiment to create a three-dimensional map. FIG. 3 is a view of a state of work illustrated in FIG. 2, which is viewed from behind the user. As illustrated in FIG. 2 and FIG. 3, when a tablet PC is used as the scanner main body 1 with the depth sensor 2 being fixed to the scanner main body 1, the user can hold the three-dimensional scanner by hand to move or rotate the three-dimensional scanner. That is, it is possible to handle the six degrees of freedom of translation and rotation.

The scanner main body 1 includes, as functional blocks, a feature extraction module 11, a mapping module 12, a storage 13, a movement candidate determination module 14, a registered feature acquisition module 15, a mapping evaluation module 16, and an output module 17.

The feature extraction module 11 extracts a feature of the measurement target based on a plurality of pieces of measurement data obtained from the depth sensor 2. The feature to be extracted includes a shape feature and a so-called primitive. The shape feature includes, for example, an edge line or other such straight line, vertices or other such points, a direction of the straight line, and a normal to a plane. The primitive includes, for example, a circle, a rectangle, and a sphere.

As a method of extracting a feature, for example, a curvature calculation method can be used for extracting vertices. For the extraction of an edge line, for example, a Hough transform method can be used. For the extraction of a primitive, for example, a model fitting method using a 3D model can be used.

Figure 4:
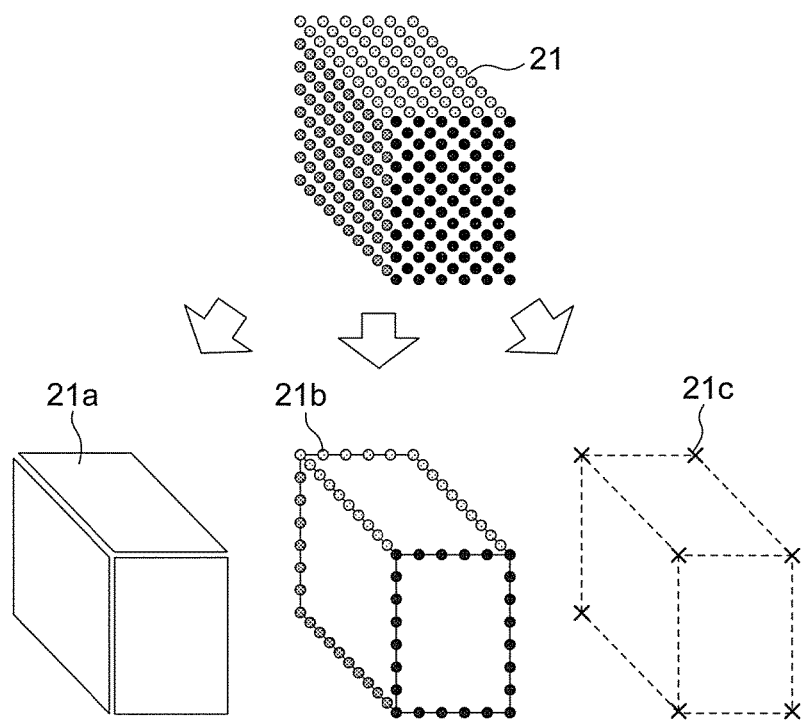
FIG. 4 is an explanatory diagram for illustrating an example of a method of extracting shape features by a feature extraction module of FIG. 1.

FIG. 4 is an explanatory diagram for illustrating an example of a method of extracting shape features by the feature extraction module 11 of FIG. 1. For example, when a rectangular parallelepiped is measured by the depth sensor 2, such a three-dimensional point cloud 21 as illustrated in FIG. 4 is obtained as measurement data. It is possible to extract a plurality of planes 21a by subjecting the three-dimensional point cloud 21 to primitive fitting. A sphere or the like can also be extracted by similar primitive fitting.

In addition, it is possible to extract a plurality of edge lines 21b by detecting points exhibiting a steep gradient change in the periphery of the three-dimensional point cloud 21 and detecting a straight line connecting those points. Further, it is possible to extract a plurality of vertices 21c from information on, for example, a point of interest having the periphery exhibiting a high curvature or an intersection point of edge lines.

The mapping module 12 causes features observed in common between different pieces of measurement data to overlap each other through use of the extracted features, and subjects the pieces of measurement data to registration, to thereby create and update a three-dimensional map.

The mapping module 12 then calculates the position and direction of the depth sensor 2 (hereinafter referred to as "sensor position/direction") exhibited at the time of data acquisition based on a result of the registration. The mapping module 12 further adds and updates three-dimensional map information, sensor position information, and sensor direction information in the storage 13. The storage 13 stores the information obtained from the mapping module 12.

As a specific example of the mapping method, the mapping module 12 first selects at least two pieces of measurement data, namely, 3D data. Subsequently, the mapping module 12 extracts a feature from the selected pieces of 3D data. At this time, different constraint conditions are obtained at the time of the calculation for the overlapping depending on what kind of features are extracted and used.

After that, the mapping module 12 associates features of the pieces of 3D data with each other. That is, the mapping module 12 finds common features. Then, coordinate transformation is performed so that the features of the pieces of 3D data overlap each other. For example, with the pieces of 3D data before the movement being used as a reference, the pieces of 3D data after the movement are subjected to the coordinate transformation so that a feature in the pieces of 3D data after the movement overlaps a feature in the pieces of 3D data before the movement.

In this case, a relative position/posture relationship of the depth sensor 2 after the movement with respect to the depth sensor 2 before the movement is obtained. In terms of implementation, a transformation matrix for coordinate transformation, that is, a matrix formed of relative position-posture information on the depth sensor 2, is calculated. At least one kind of feature among features including points (any one of 2D or 3D is acceptable), lines (2D, 3D), and planes (3D) is used to calculate the transformation matrix.

Figure 5:
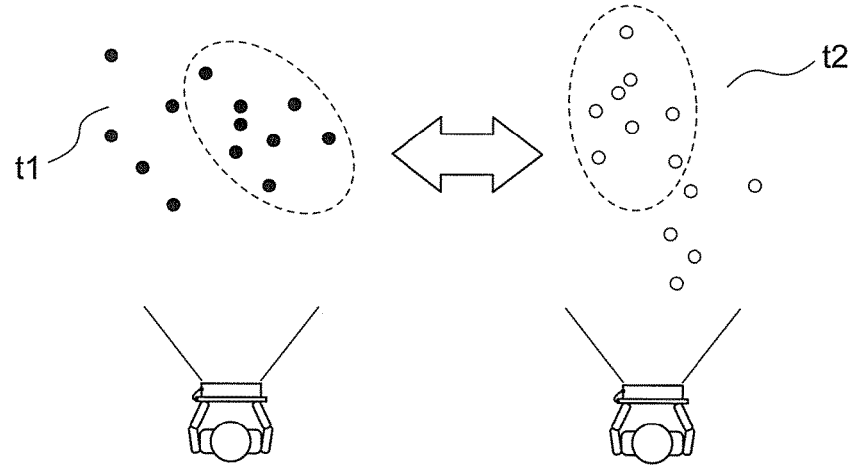
FIG. 5 is an explanatory diagram for illustrating first and second feature point groups, which are obtained by the feature extraction module of FIG. 1, side by side.
Figure 6:
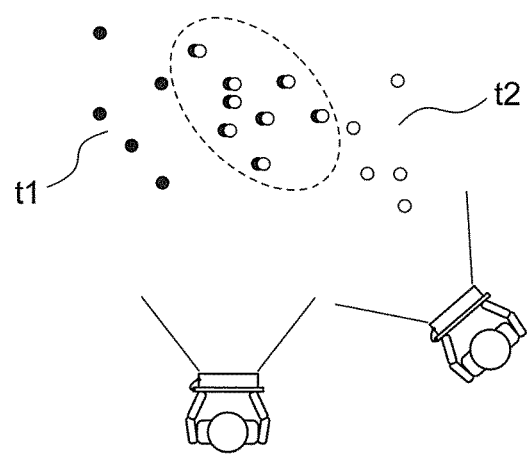
FIG. 6 is an explanatory diagram for illustrating a state under which common parts between the first and second feature point groups of FIG. 5 are caused to overlap each other.
Figure 7:
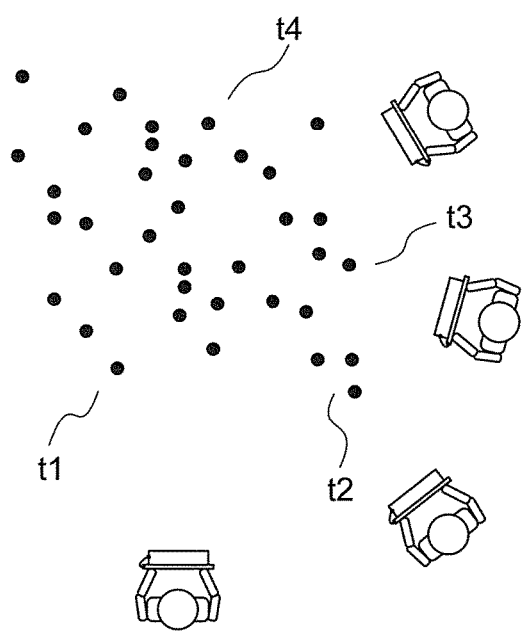
FIG. 7 is an explanatory diagram for illustrating a state under which common parts between third and fourth feature point groups are caused to overlap the first and second feature point groups of FIG. 6.

FIG. 5 is an explanatory diagram for illustrating first and second feature point groups t1 and t2, which are obtained by the feature extraction module 11 of FIG. 1, side by side. FIG. 6 is an explanatory diagram for illustrating a state under which common parts between the first and second feature point groups t1 and t2 of FIG. 5 are caused to overlap each other. FIG. 7 is an explanatory diagram for illustrating a state under which common parts between third and fourth feature point groups of FIG. 6 are caused to overlap the first and second feature point groups t1 and t2.

The mapping module 12 compares the first feature point group t1 included in first measurement data and the second feature point group t2 included in second measurement data to detect common parts therebetween. Then, the coordinates of the second measurement data are transformed so that the common parts (within the dotted line in FIG. 6) overlap each other.

After that, the mapping module 12 compares the third feature point group t3 included in third measurement data with the feature point groups t1 and t2 to detect common parts therebetween, and transforms the coordinates of the third measurement data so that the common parts overlap each other. Subsequently, the mapping module 12 compares the fourth feature point group t4 included in fourth measurement data with the feature point groups t1, t2, and t3 to detect common parts therebetween, and transforms the coordinates of the fourth measurement data so that the common parts overlap each other. Such processing is repeated to create a three-dimensional map.

The movement candidate determination module 14 determines a movement candidate being a candidate for a position and direction to/in which the depth sensor 2 is to be moved next. There may be only one movement candidate, or may be two or more movement candidates. The movement candidate for the position may be the current position.

In addition, a spot moved to/in a relatively fixed position and direction with respect to the current sensor position/direction, for example, moved in four directions by a translation amount of 10 cm and a rotation amount of 10 degrees in each of up, down, right, and left directions, may be set as the movement candidate. Further, as the movement candidate, a position and direction to/in which the movement is to be performed may be manually input. Furthermore, the position and direction to/in which the depth sensor 2 is to be moved next may be predicted from the movement locus of the depth sensor 2 to the current position, and the predicted position and direction may be set as the movement candidate.

The registered feature acquisition module 15 acquires a feature within the movement candidate, which is a feature estimated to be observable by the depth sensor 2 from the movement candidate, from among the features registered in the three-dimensional map.

The mapping evaluation module 16 evaluates the stability of the mapping performed from the movement candidate through use of the feature within the movement candidate, which has been acquired by the registered feature acquisition module 15. As a method of evaluating the stability of the mapping, there is a method of determining whether or not the minimum number of features required for the registration are observable, that is, determining whether or not the calculation itself for the registration can be performed. In this case, for example, when the number of features is equal to or smaller than a number set in advance, it is determined that the calculation cannot be performed.

As another method of evaluating the stability of the mapping, there is a method of calculating a prediction error in mapping from the kind and arrangement of features. The arrangement of features represents a distribution of observable features within the sensor field of view from the movement candidate.

Figure 8:
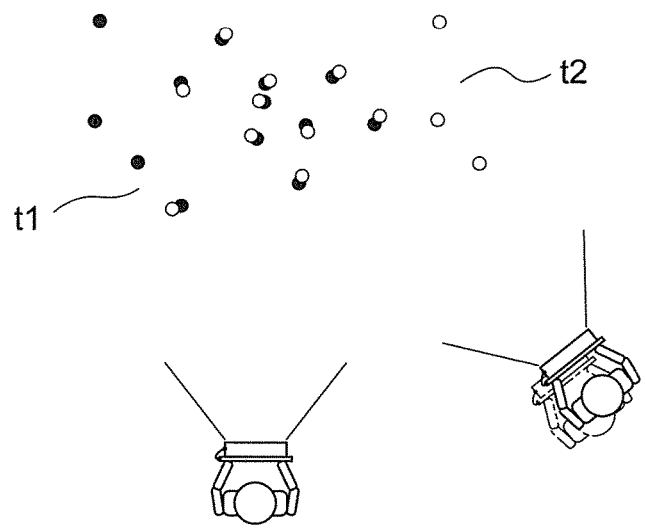
FIG. 8 is an explanatory diagram for illustrating an example of a mapping result obtained when a prediction error is small.

In a case where there is no measurement error, as illustrated in FIG. 6, the sensor position/direction calculated through the mapping is the same as the actual sensor position/direction. Even in a case where there is a measurement error, when the common parts between the different feature point groups t1 and t2 are dispersed over a relatively wide range as illustrated in FIG. 8, the sensor position/direction calculated through the mapping is estimated to be substantially the same as the actual sensor position/direction, and the prediction error is small.

Figure 9:
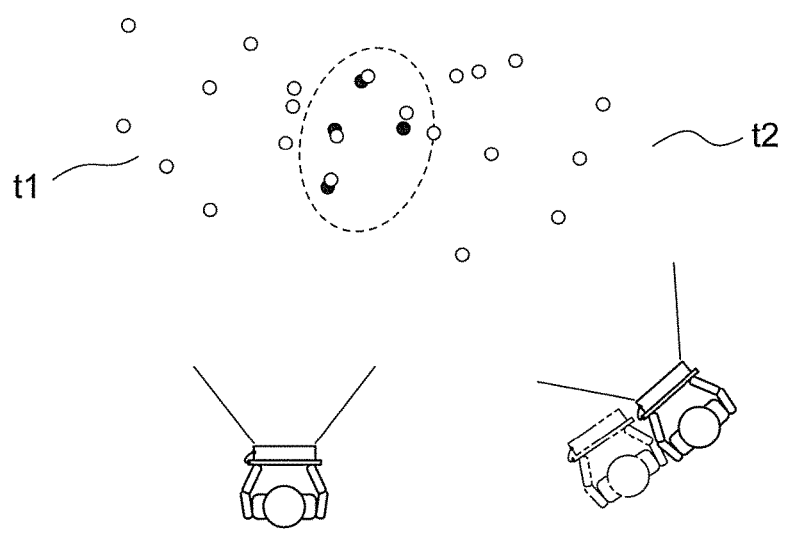
FIG. 9 is an explanatory diagram for illustrating an example of a mapping result obtained when the prediction error is large.

Meanwhile, in the case where there is a measurement error, when the common parts between the different feature point groups t1 and t2 are locally distributed in a relatively narrow range as illustrated in FIG. 9, there is a large prediction error between the sensor position/direction calculated through the mapping and the actual sensor position/direction.

As a method of calculating the prediction error, there is a method using an error in registration of the pieces of measurement data, which occurs when there is a minute change in position of an observable feature. In this case, as the distribution of features further deviates within the sensor field of view, the error in registration tends to become larger. In addition, as the number of features becomes smaller, the error in registration that has occurred when there is a change in position of the feature tends to become relatively larger. Therefore, as the number of features within the sensor field of view becomes larger, the evaluation becomes more satisfactory.

At this time, the minute change amount of the position of the feature can be defined as the amount of displacement of the feature, which may occur when the feature is actually extracted from the sensor data, and there is a method of determining the minute change amount as the resolution of the distance measurement (for example, measurement error in a depth direction or distance measurement interval in a horizontal (vertical) direction) when the depth sensor 2 uses a ToF method and as one pixel when the depth sensor 2 uses a camera.

Under an ideal state under which there is no measurement error, the registration error of the measurement data that occurs at the time of the mapping is expected to become zero irrespective of the magnitude of a prediction error. However, an error always occurs in actual measurement, and hence it is assumed that, as the prediction error becomes larger, the registration error of the measurement data at the time of the actual mapping becomes larger as well.

In contrast, in a case where the prediction error is small, even when an error occurs in the measurement data, the registration error at the time of the mapping tends to become smaller.

As a specific example of a mapping evaluation method, the mapping evaluation module 16 first selects one sensor position/posture for which the mapping is to be evaluated. At this time, for example, the position/posture is shifted by a fixed amount from the current sensor position/posture. Subsequently, the mapping evaluation module 16 acquires a feature observable from the selected sensor position/posture from the map that has been created.

After that, the mapping evaluation module 16 determines whether or not the mapping can be performed through use of the acquired feature. For example, at least three different points are required as the 3D points, and at least three different planes are required as the planes. When a plurality of features are used in combination, the required minimum number of features varies depending on the combination of features, for example, two 3D points and one plane are required. A criterion for determining whether or not the mapping can be performed thus differs depending on the feature to be used.

When the mapping can be performed, the mapping is executed through use of all features. The mapping is also executed by shifting the position (direction in the case of a normal to a plane) of the feature to be used for the mapping. At this time, for example, the position of the feature is shifted by one pixel on an image, or shifted by 1 mm in the space.

Then, the mapping is executed through use of a minimum number or a larger number of features that enable the mapping from among the acquired features. A statistic using the relative change amount of the sensor position/posture is acquired from a plurality of mapping results obtained by any one of those mapping methods or by a combination thereof, and an evaluation value is calculated based on the statistic.

For example, it is assumed that, when the statistic serving as the evaluation value is set as the dispersion value of the relative change amount of the sensor position/posture, the evaluation becomes more satisfactory as the value becomes smaller.

A reprojection error of the feature may be set for the evaluation value. The reprojection error is obtained by projecting the feature in the map onto a 2D image acquired at each sensor position/posture through use of the calculated position/posture of the sensor, and calculating a difference between the 2D position of the feature on the original 2D image and the 2D position of the projected feature. This is one of basic evaluation methods in the relevant technical field.

In a simpler way, at least any one of the deviation or density of the distribution of features within the sensor field of view may be used as the evaluation value. In this case, it is assumed that the evaluation becomes more unsatisfactory as the deviation becomes larger, and that the evaluation becomes more satisfactory as the density becomes higher.

Further, the predicted moving direction of the depth sensor 2 may be used for evaluation. In this case, the evaluation is assumed to be satisfactory when, for example, a large number of features exist in the moving direction of the sensor.

The output module 17 presents at least any one of the moving direction or moving speed of the depth sensor 2 corresponding to the movement candidate to the user based on an evaluation result obtained from the mapping evaluation module 16. As a method for the presentation, there are a method of performing indication in an illustration through use of a display or other such display device and a method using voice.

In this case, the moving direction is obtained as a direction from the current position of the depth sensor 2 toward a movement candidate for which the stability of the mapping has been evaluated. The moving speed is obtained as a speed at which a blur ascribable to the moving speed does not occur in the acquired data of the depth sensor 2, or is obtained by, for example, dividing a distance from the current position of the depth sensor 2 to the movement candidate for which the stability of the mapping has been evaluated by the time interval for the data acquisition of the depth sensor 2. The moving speed may be acquired as an absolute value or may be acquired as a relative value with respect to the moving speed of the depth sensor 2 at the time of the previous data acquisition.

As contents to be presented through use of the display device, there are two kinds of information of: (A) processing results including measurement data currently acquired from the depth sensor 2 and extracted features; and (B) the bird's-eye view of the generated three-dimensional map, the sensor position/direction, and other such information registered in the storage 13. Simultaneously presenting the items (A) and (B) to the user facilitates the grasping of a scanning situation. At this time, when the sensor position/direction in the three-dimensional map is superimposed on the item (B), it becomes much easier to grasp the situation.

Figure 10:
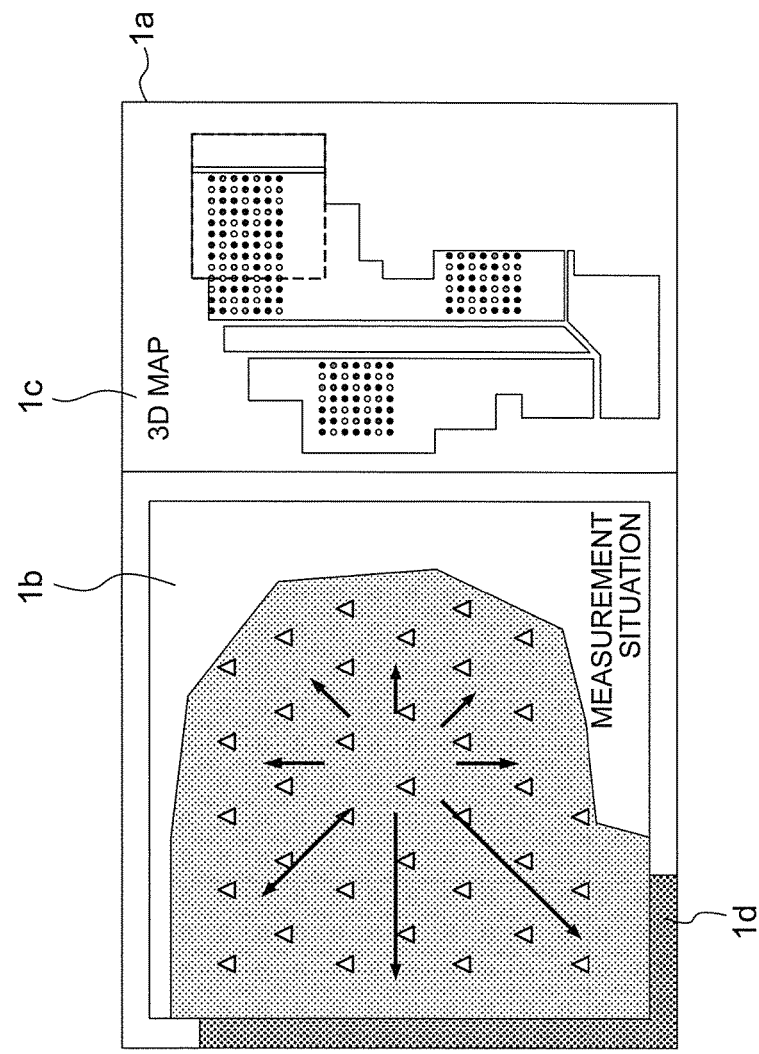
FIG. 10 is an explanatory diagram for illustrating an example of display contents displayed on a display device by an output module of FIG. 1.

FIG. 10 is an explanatory diagram for illustrating an example of display contents displayed on the display device by the output module 17 of FIG. 1. In FIG. 10, an example of performing the display on a display 1a of a tablet PC being the display device is illustrated. In this example, the display 1a is divided into two parts of a left part and a right part. The left part is the measurement situation display area 1b, and the right part is a three-dimensional map display area 1c.

In the measurement situation display area 1b, the current situation of measurement performed by the depth sensor 2 and the presentation contents of the moving direction and moving speed of the depth sensor 2 output by the output module 17 are displayed. In the three-dimensional map display area 1c, a three-dimensional map being created is displayed.

A frame portion 1d is provided to the four peripheral sides of the measurement situation display area 1b. In the frame portion 1d, a direction to a mapped area and a direction to an unmeasured area are displayed so as to be distinguished from each other. In the example of FIG. 10, the direction to the mapped area and the direction to the unmeasured area are distinguished from each other by different colors or tones. For example, in FIG. 10, the darker part indicates the direction to the mapped area. The detection of the unmeasured area is described in a sixth embodiment of the present invention described later.

Meanwhile, in the center of the measurement situation display area 1b, that is, a part surrounded by the frame portion 1d, the extracted features and the presented moving direction and moving speed of the depth sensor 2 are displayed. In this example, the features are indicated by the triangles, the moving directions of the depth sensor 2 are indicated by the directions of the arrows, and the moving speeds of the depth sensor 2 are indicated by the lengths of the arrows.

Figure 11:
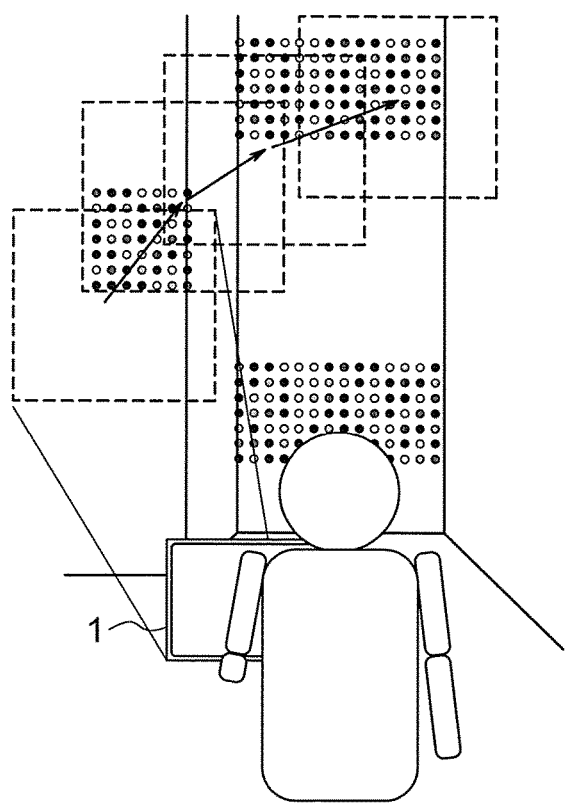
FIG. 11 is an explanatory diagram for illustrating a state of mapping work corresponding to a three-dimensional map display area of FIG. 10.

In the three-dimensional map display area 1c, the three-dimensional map being created is displayed in association with mapping work. FIG. 11 is an explanatory diagram for illustrating a state of the mapping work corresponding to the three-dimensional map display area 1c of FIG. 10. In FIG. 11, the path of the depth sensor 2 is indicated by the arrows, and the field of view of the depth sensor 2 is indicated by the dotted-line rectangles.

Figure 12:
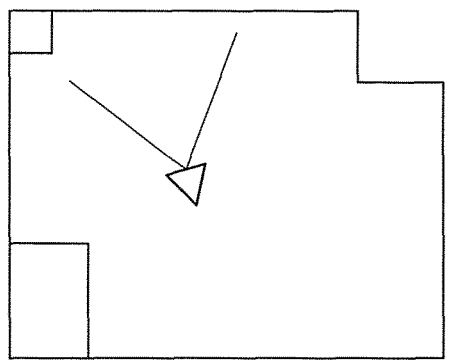
FIG. 12 is an explanatory diagram for illustrating an example of a horizontal cross section of an elevator shaft displayed on the display device by the output module of FIG. 1.
Figure 13:
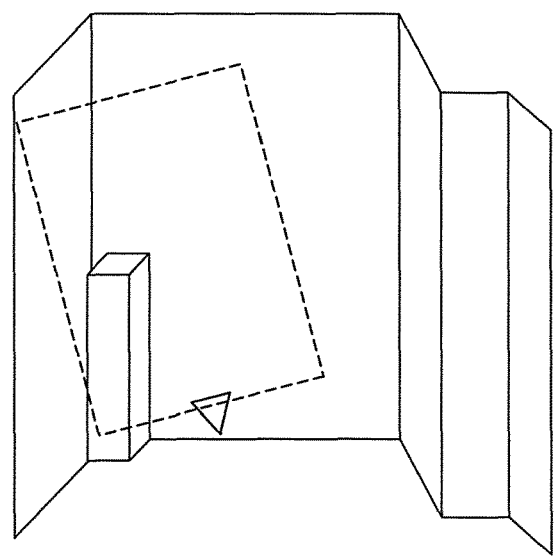
FIG. 13 is an explanatory diagram for illustrating an example of a vertical cross section of the elevator shaft displayed on the display device by the output module of FIG. 1.

In the above-mentioned item (B), it is also effective to change a bird's-eye point of view depending on the measurement target. As an example, when the inside of an elevator shaft or other such closed space is used as the measurement target, it suffices that there are bird's-eye views from two points of view, namely, a view from a bird's-eye point of view (horizontal cross section is acceptable) obtained by viewing the three-dimensional map from immediately above as illustrated in FIG. 12 and a vertical cross section from which the optical axis direction of the depth sensor 2 can be viewed as illustrated in FIG. 13. This facilitates the association between a two-dimensional drawing and a three-dimensional shape. In FIG. 12 and FIG. 13, the triangular marks each indicate the sensor position/direction.

At this time, when the projection style of a horizontal sectional view is projected in parallel, the display becomes closer to the two-dimensional drawing, which facilitates an intuitive understanding. Meanwhile, when the projection style of a vertical sectional view is perspectively projected, the display becomes closer to a three-dimensional appearance, which facilitates an intuitive understanding.

As another example, in a case where the outer appearance of an object is used as the measurement target for component inspection or other such purpose, when such bird's-eye views from a plurality of points of view as to surround the measurement target so as not to have a dead angle are displayed, it is possible to easily discover a part for which the measurement data has not been obtained.

When a recommended moving direction of the depth sensor 2 or a direction that inhibits the movement is superimposed and displayed on the above-mentioned item (A) or (B), it is possible to intuitively understand the direction in which the depth sensor 2 is to be moved. When the moving direction is superimposed and displayed as arrows, the user can intuitively know, with the addition of a change in length of the arrow, blinking display thereof, or other such visual effect, whether the current moving speed of the depth sensor 2 is too fast or too slow.

When the information is presented to the user by voice, it is advantageous that scanning guidance can be achieved without viewing the display device. In addition, when the presentation using the display device and the presentation using voice are used in combination, more complicated guidance can be performed.

Figure 14:
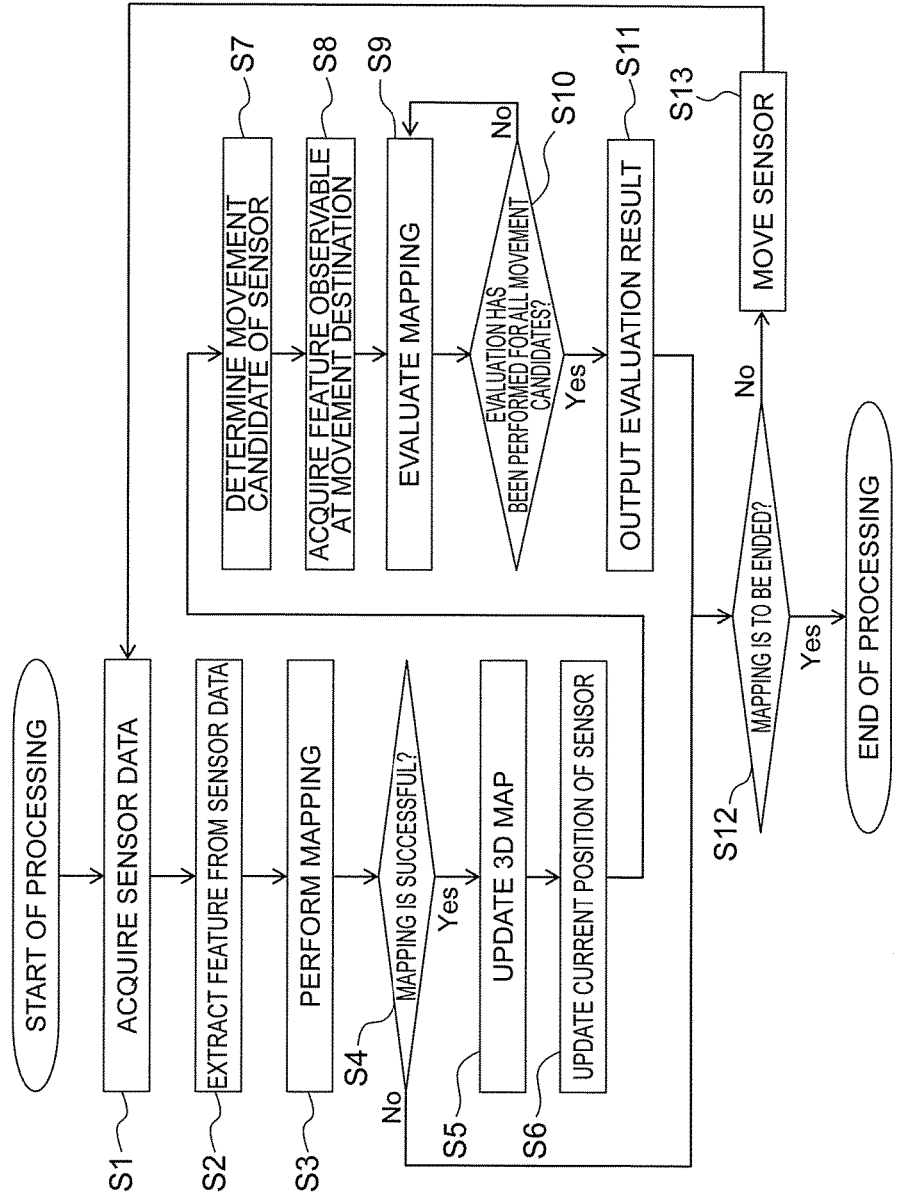
FIG. 14 is a flow chart for illustrating an operation of a scanner main body of FIG. 1.

Next, FIG. 14 is a flow chart for illustrating an operation of the scanner main body 1 of FIG. 1. When the processing is started, the scanner main body 1 acquires measurement data from the depth sensor 2 (Step S1), and extracts a feature from the measurement data (Step S2). Subsequently, the scanner main body 1 creates a three-dimensional map by superimposing the features of a plurality of pieces of measurement data (Step S3). After that, the scanner main body 1 determines whether or not the mapping is successful (Step S4), and when the mapping is successful, updates the three-dimensional map (Step S5).

When the mapping is unsuccessful, the scanner main body 1 inquires of the user whether or not to end the mapping (Step S12). When the mapping is to be continued, the scanner main body 1 notifies the user to move the depth sensor 2 (Step S13), and the procedure returns to Step 1.

When the mapping is successful and the three-dimensional map is updated, the scanner main body 1 calculates and updates the current position and direction of the depth sensor 2 (Step S6). Subsequently, the scanner main body 1 determines the movement candidate of the depth sensor 2 (Step S7), and acquires the feature within the movement candidate (Step S8).

After that, the scanner main body 1 evaluates the stability of the mapping performed from the movement candidate through use of the feature within the movement candidate (Step S9). The mapping evaluation is performed until the stability of the mapping is evaluated for all the movement candidates (Step S9 and Step S10).

When the mapping evaluation is ended for all the movement candidates, the scanner main body 1 presents at least any one of the moving direction or moving speed of the depth sensor 2 to the user as an evaluation result (Step S11). Then, the scanner main body 1 inquires of the user whether or not to end the mapping (Step S12). When the mapping is to be continued, the scanner main body 1 notifies the user to move the depth sensor 2 (Step S13), and the procedure returns to the Step 1. When an instruction to end the mapping is input by the user, the processing is brought to an end.

In the above-mentioned three-dimensional scanner and measurement assistance processing method for the same, at least anyone of the moving direction or moving speed of the depth sensor 2 is presented to the user based on a result of evaluating the stability of the mapping, and hence it is possible to create a three-dimensional map more smoothly with higher accuracy.

That is, it is difficult to predict the success or failure of the mapping and the accuracy thereof only by visually observing each piece of measurement data and extracted features. However, the stability of the mapping is evaluated for the movement candidate by the scanner main body 1, and the moving direction of the sensor in which the mapping is expected to fail is known in advance. Therefore, it is possible to prevent a failure in mapping, and to reduce time and labor to redo scanning work. In addition, it is possible to know the moving direction that enables the mapping to be performed with high accuracy, and hence the accuracy of the mapping is expected to be improved. Further, it is no longer required to repeatedly redo scanning by trial and error until the accuracy is satisfactory.

Second Embodiment

Figure 15:
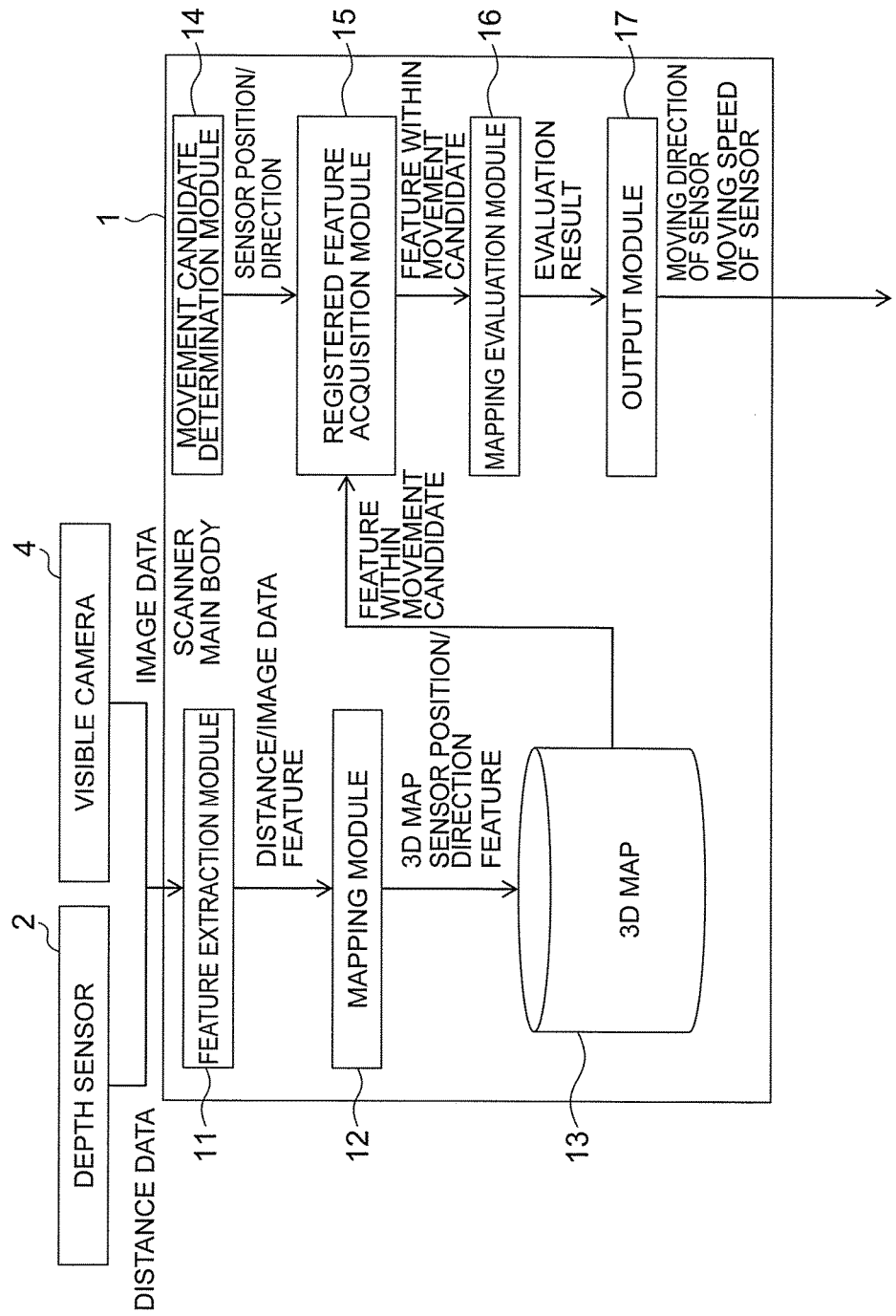
FIG. 15 is a block diagram for illustrating a three-dimensional scanner according to a second embodiment of the present invention.

Next, FIG. 15 is a block diagram for illustrating a three-dimensional scanner according to a second embodiment of the present invention. In the second embodiment, in addition to the depth sensor 2, a visible camera 4 capable of acquiring a color or monochrome two-dimensional image is used in combination, and the mapping is performed by using not only the shape feature extracted from the distance data but also a visual feature extracted from image data at the same time.

The feature extraction module 11 extracts a feature from the distance data obtained from the depth sensor 2, and also extracts visual features, for example, a feature point and a straight line, from the image data obtained from the visible camera 4. As a method of extracting a feature from the image data, for example, in the case of the feature point, Hough transform can be applied to a corner point corresponding to the corner of an object. In the case of the straight line, Hough transform can be applied to the contour of an object after the contour is detected from an image.

Figure 16:
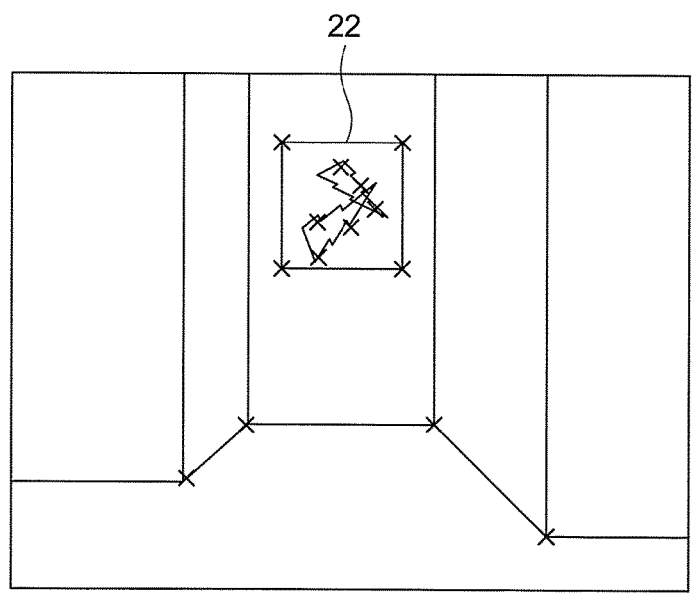
FIG. 16 is an explanatory diagram for illustrating an example of a method of extracting visual features by a feature extraction module of FIG. 15.

FIG. 16 is an explanatory diagram for illustrating an example of a method of extracting visual features by the feature extraction module 11 of FIG. 15. In FIG. 16, an image acquired by the visible camera 4 is illustrated. In FIG. 16, the x marks indicate the extracted feature points.

In the feature extraction module 11, a point exhibiting a large change in hue around a point of interest is extracted as a feature point. At this time, it is possible to extract a straight line, but a point that cannot be distinguished from a neighboring point, for example, a point on a straight line, is not extracted as a feature point even when the change in hue is large. In addition, the corners of a pillar and the corners of a poster 22 hanging on a wall are extracted as feature points. The feature points can also be extracted from the pattern of the poster 22 and the like.

In the mapping module 12, the storage 13, the registered feature acquisition module 15, and the mapping evaluation module 16, the feature obtained from the image data is also used in addition to the feature obtained from the distance data. All other configurations and operations are similar or identical to the first embodiment.

According to the above-mentioned three-dimensional scanner and measurement assistance processing method for the same, a larger number of features can be used, which can further improve the stability of the mapping.

The visible camera 4 may be integrated with the depth sensor 2, or may be separately provided.

Third Embodiment

Figure 17:
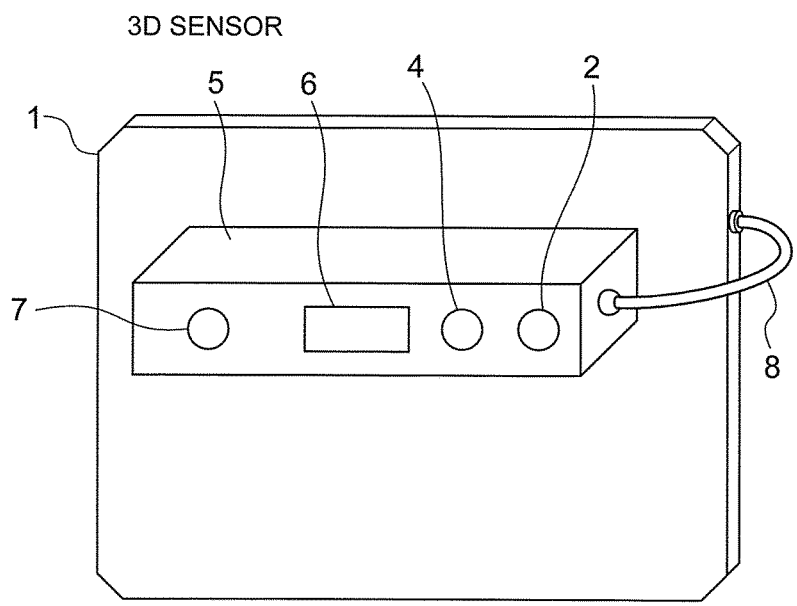
FIG. 17 is a front view for illustrating a three-dimensional scanner according to a third embodiment of the present invention.
Figure 18:
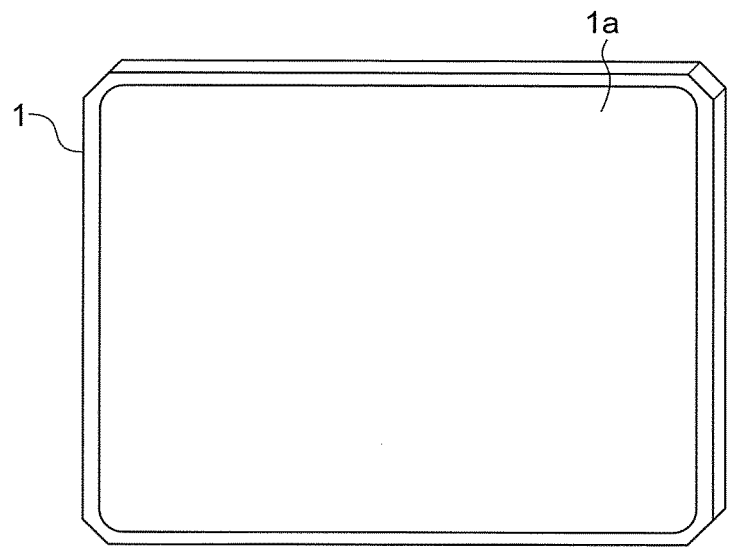
FIG. 18 is a back view for illustrating the three-dimensional scanner of FIG. 17.

Next, FIG. 17 is a front view for illustrating a three-dimensional scanner according to a third embodiment of the present invention. FIG. 18 is a back view for illustrating the three-dimensional scanner of FIG. 17. In the third embodiment, a casing 5 to which the depth sensor 2 and the visible camera 4 are mounted is fixed to the scanner main body 1. As the depth sensor 2, a camera for measuring a distance is used.

In addition, an illumination device 6 and a projector 7 are mounted to the casing 5. The casing 5 and the scanner main body 1 are connected to each other through a cable 8. The devices mounted to the casing 5 are supplied with power from the scanner main body 1 through the cable 8. The depth sensor 2 and the visible camera 4 transmit data to the scanner main body 1 through the cable 8. The devices mounted to the casing 5 also receive an instruction signal from the scanner main body 1 through the cable 8.

The projector 7 projects a pattern onto the measurement target. The depth sensor 2 photographs the projected pattern to detect the distance data by an active stereo method. The illumination device 6 irradiates the measurement target with light. All other configurations and operations are similar or identical to the second embodiment.

In this manner, as the measurement method of the depth sensor 2, an active stereo method using pattern projection performed by a system using a projector and a camera may be used.

In addition, light is applied to the measurement target by the illumination device 6, thereby facilitating the extraction of visual features from the image data obtained by the visible camera 4 even when the measurement is performed in a pit of the elevator shaft or other such dark place.

Further, the depth sensor 2 and the visible camera 4 are integrated with the illumination device 6, and hence a positional relationship therebetween is constantly fixed, which can reduce a difference in appearance due to a difference in point of view. It is also possible to reduce a probability of a shadow formed due to the presence of a shielding object between the measurement target and the illumination device 6.

In the third embodiment, the illumination device 6 is integrated with the depth sensor 2 and the visible camera 4, but an illumination device installed in a measurement environment, for example, a hoistway pit, may be used.

Fourth Embodiment

Figure 19:
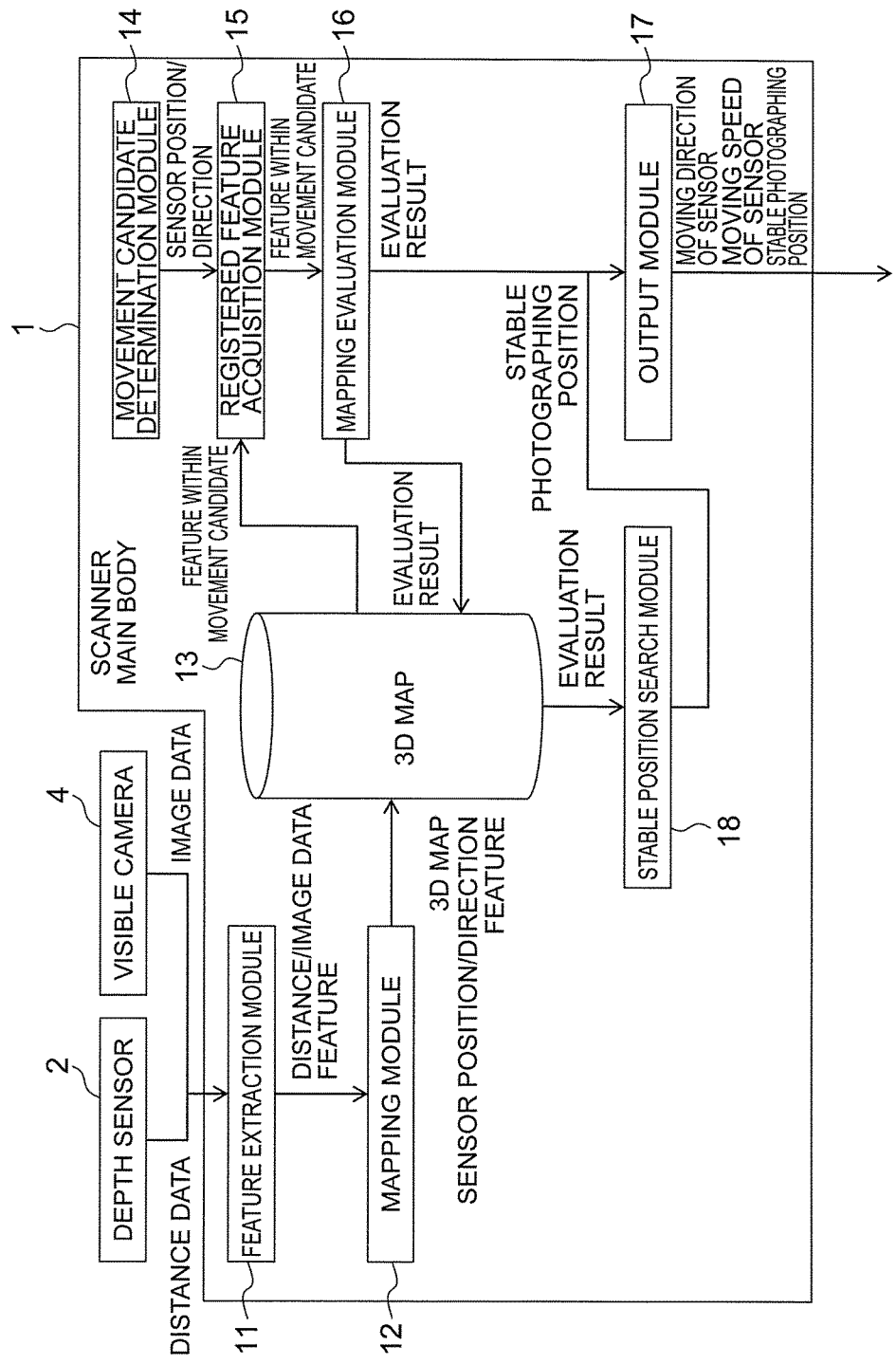
FIG. 19 is a block diagram for illustrating a three-dimensional scanner according to a fourth embodiment of the present invention.

Next, FIG. 19 is a block diagram for illustrating a three-dimensional scanner according to a fourth embodiment of the present invention. The scanner main body 1 according to the fourth embodiment further includes a stable position search module 18 configured to search the three-dimensional map being created for a photographing position at which the mapping is stable. The mapping evaluation module 16 registers, in the storage, the evaluation result obtained for the registered sensor position/direction. The output module 17 presents the photographing position obtained by the stable position search module 18 to the user.

The stable position search module 18 searches for a position for which the evaluation result is satisfactory from among mapping evaluation results obtained for respective sensor positions/directions, which are registered in the storage 13. A criterion for the priority of the position to be output is determined by the value of an evaluation function obtained in consideration of the magnitude of the evaluation value of the mapping and the degree of closeness to the current position.

The evaluation function to be used may be the same at all times, or may be changed by the user selecting a priority item depending on the situation. The stable position search module 18 starts to search for the stable position when the mapping fails or when the mapping evaluation value for the current position becomes equal to or smaller than a given value. In addition to any one of those situations, the search may be started when the user designates the search. All other configurations and operations are similar or identical to the first, second, or third embodiment.

Figure 20:
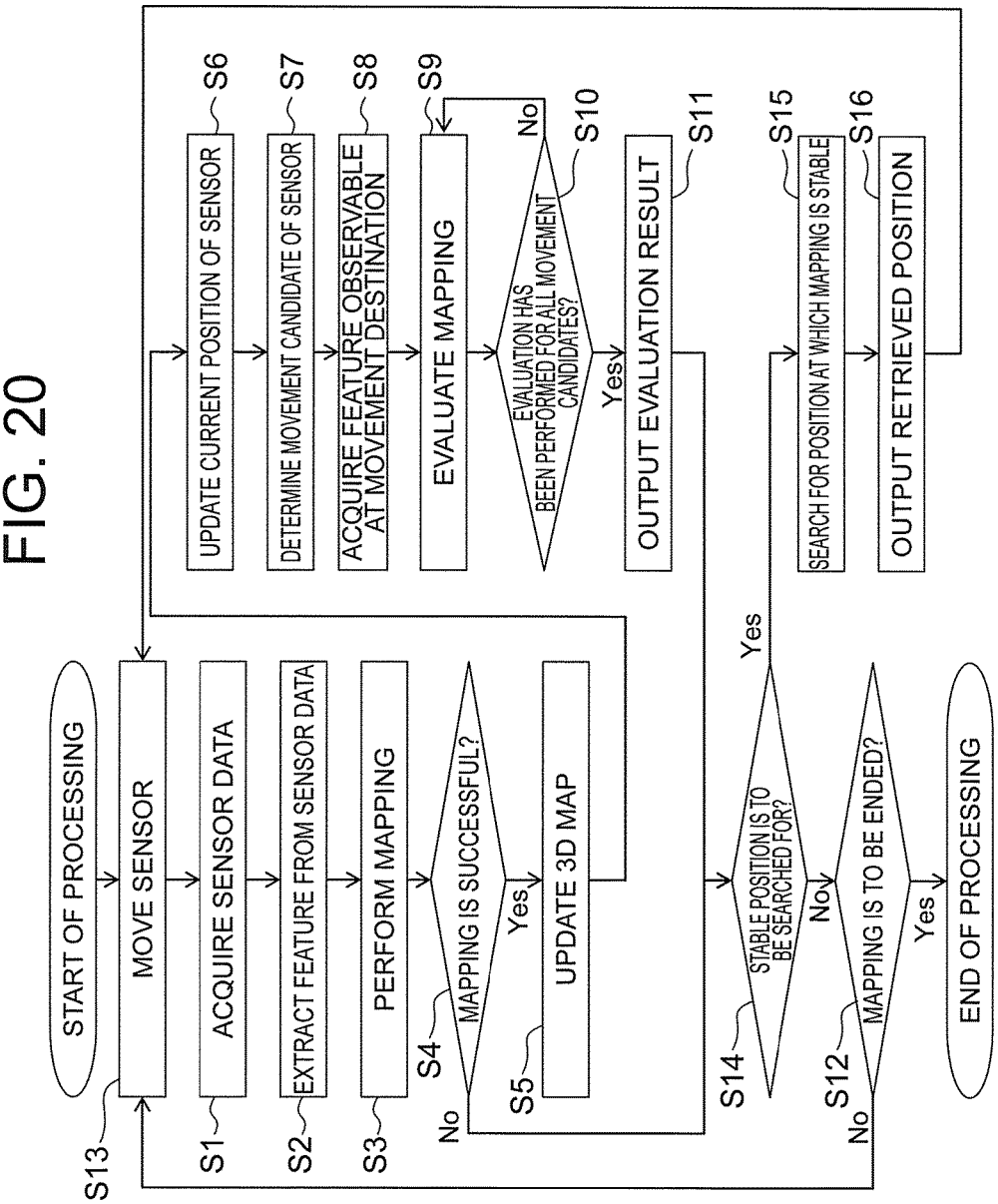
FIG. 20 is a flow chart for illustrating an operation of a scanner main body of FIG. 19.

FIG. 20 is a flow chart for illustrating an operation of the scanner main body 1 of FIG. 19. The scanner main body 1 according to the fourth embodiment determines whether or not to search for the stable position (Step S14) depending on the determination result as to whether or not the mapping is successful (Step S4), the mapping evaluation result (Step S11), and the presence or absence of the user's designation. When determining that the search is required, the scanner main body 1 searches for the position at which the mapping is stable (Step S15), and presents the retrieved position to the user (Step S16).

In addition to the effects of the first to third embodiments, the above-mentioned three-dimensional scanner and measurement assistance processing method for the same produce such an effect that it is possible to easily recover from a state under which the mapping is unstable by returning to the photographing position at which the mapping is stable when the mapping becomes unstable due to a decrease in number of features within the sensor field of view.

Fifth Embodiment

Figure 21:
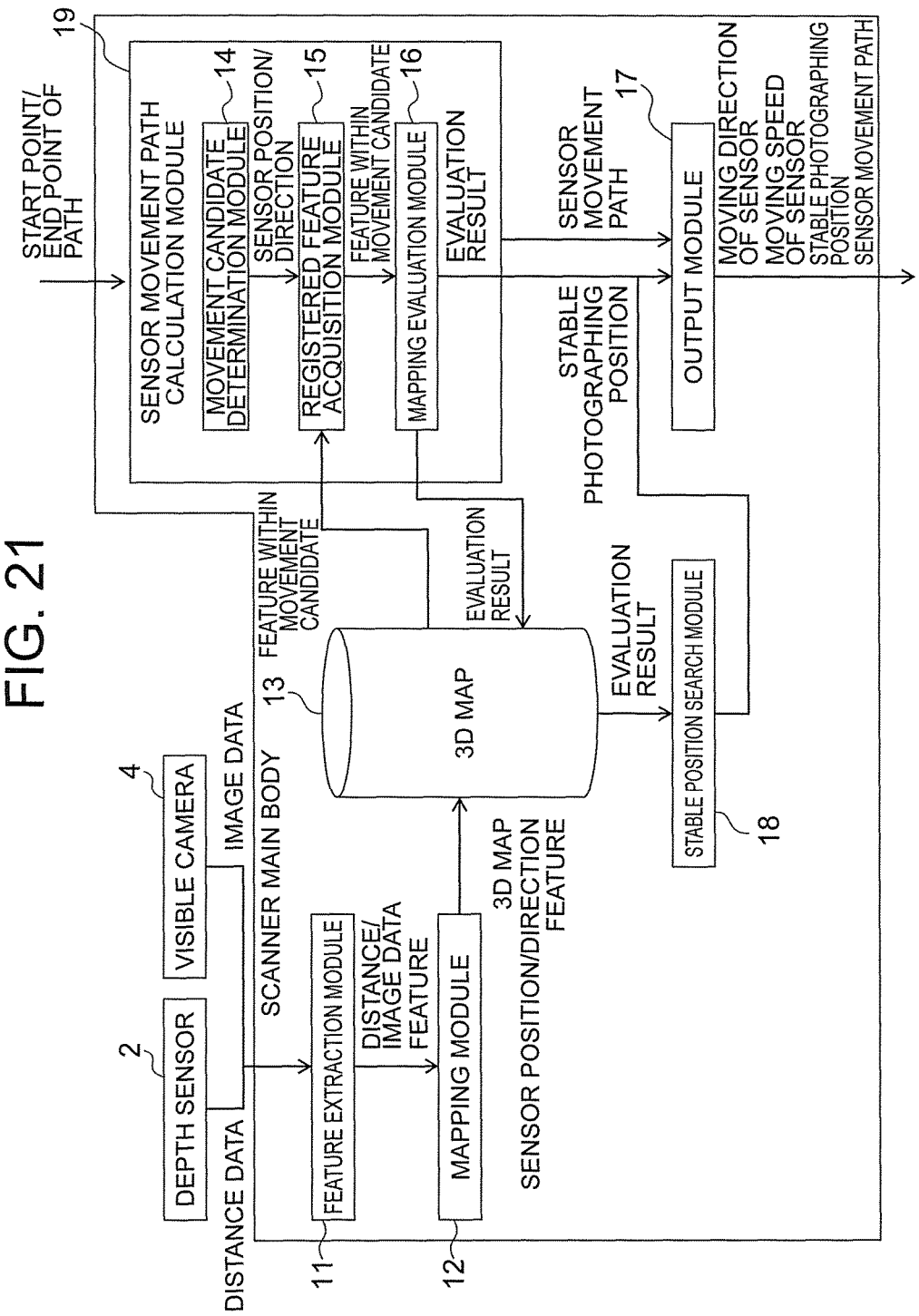
FIG. 21 is a block diagram for illustrating a three-dimensional scanner according to a fifth embodiment of the present invention.

Next, FIG. 21 is a block diagram for illustrating a three-dimensional scanner according to a fifth embodiment of the present invention. The scanner main body 1 according to the fifth embodiment further includes a sensor movement path calculation module 19 configured to calculate a sensor movement path between freely-selected positions in the three-dimensional map being created, which enables movement without interruption of the mapping.

The sensor movement path calculated by the sensor movement path calculation module 19 includes a start point, an end point, and a plurality of via points on the sensor movement path. The initial values of the via points are set to positions sampled on a line segment connecting between the start point and the end point of the sensor movement path at regular intervals. A sensor direction at each of the via points is calculated by linear interpolation from a sensor direction at the start point and a sensor direction at the end point.

The via points may be manually set by the user. In this case, the number of via points may be increased by further sampling positions between the via points set by the user. Through manual setting of the via points, it is possible to calculate a more complicated sensor movement path. In addition, by sampling the positions between the via points set by the user, it is possible to save time and labor for the user to set a large number of via points.

The movement candidate determination module 14 determines the above-mentioned start point, end point, and via points as movement candidates. The mapping evaluation module 16 executes the mapping evaluation for the above-mentioned movement candidates. At this time, when it is determined that any one of the start point and the end point cannot be mapped, the processing for calculating the sensor movement path is brought to an end. When the via points include a given via point having a position/direction from which the mapping cannot be performed, a sensor position/direction in the vicinity of the given via point is determined as a movement candidate, and the mapping evaluation is executed again. At this time, when the via point has been changed a predetermined number of times or more, the processing for calculating the sensor movement path is brought to an end.

The output module 17 presents a result of calculating the sensor movement path to the user. At this time, the manner of displaying the sensor position/direction on the path is changed depending on whether or not the mapping can be performed therefrom. As an example, different colors are used for the display so that a sensor position from which the mapping can be performed is displayed in green and a sensor position from which the mapping cannot be performed is displayed in red. Through presentation of the position from which the mapping cannot be performed on the path to the user, it is possible to efficiently select the via point when the sensor movement path is manually reset. All other configurations and operations are similar or identical to the fourth embodiment.

Figure 22:
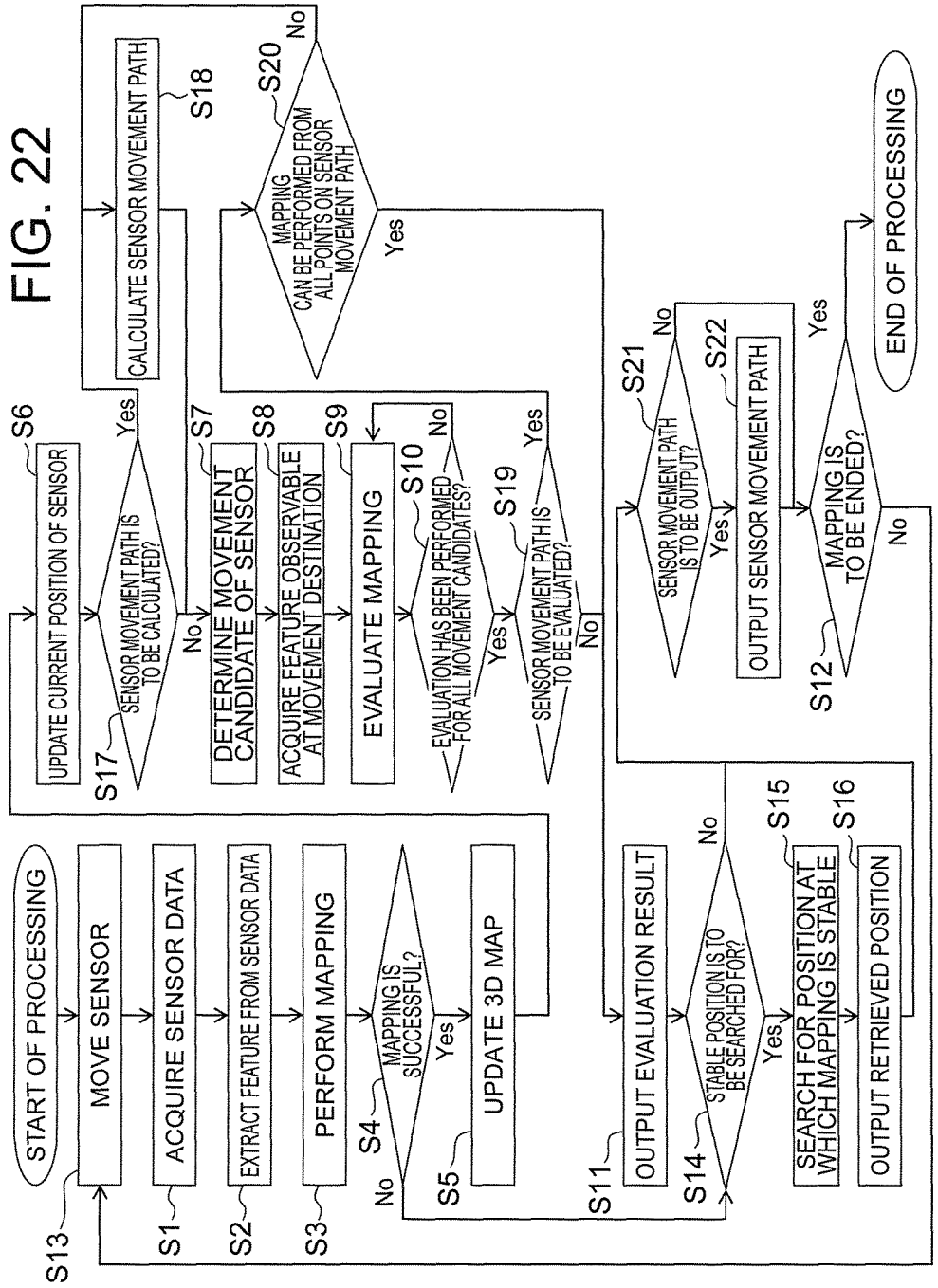
FIG. 22 is a flow chart for illustrating an operation of a scanner main body of FIG. 21.

FIG. 22 is a flow chart for illustrating an operation of the scanner main body 1 of FIG. 21. The scanner main body 1 according to the fifth embodiment updates the current position and direction of the depth sensor 2 (Step S6), and then determines whether or not to calculate the sensor movement path (Step S17). When determining that it is required to calculate the sensor movement path, the scanner main body 1 calculates the sensor movement path (Step S18).

After the stability of the mapping is evaluated for all the movement candidates (Step S9 and Step S10), the scanner main body 1 determines whether or not to evaluate the sensor movement path (Step S19). When determining that it is required to evaluate the sensor movement path, the scanner main body 1 determines whether or not the mapping can be performed from all the points on the sensor movement path (Step S20).

When there is a point from which the mapping cannot be performed on the sensor movement path, the procedure returns to Step S18. After determining that the mapping can be performed from all the points on the sensor movement path, after determining that it is not required to search for the stable position (Step S14), and after the stable position is retrieved (Step S15) and presented to the user (Step S16), the scanner main body 1 determines whether or not to present the sensor movement path to the user (Step S21).

When determining that it is required to present the sensor movement path, the scanner main body 1 presents the sensor movement path to the user (Step S22), and the procedure advances to Step S12. When it is not required to present the sensor movement path, the procedure directly advances to Step S12.

In addition to the effects of the fourth embodiment, the above-mentioned three-dimensional scanner and measurement assistance processing method for the same produce such an effect that the sensor movement path calculation module 19 allows the user to follow a path presented in advance to move to a destination, and hence it is possible to reduce work time required for scanning.

That is, there is a probability that the work time required for scanning may become longer when the scanner main body 1 moves while keeping discovering a path by trial and error so as not to interruption of the mapping before moving to a portion for which the measurement has not been performed and performing the scanning. However, in the fifth embodiment, an optimum sensor movement path is presented, and hence it is possible to reduce the work time.

Sixth Embodiment

Figure 23:
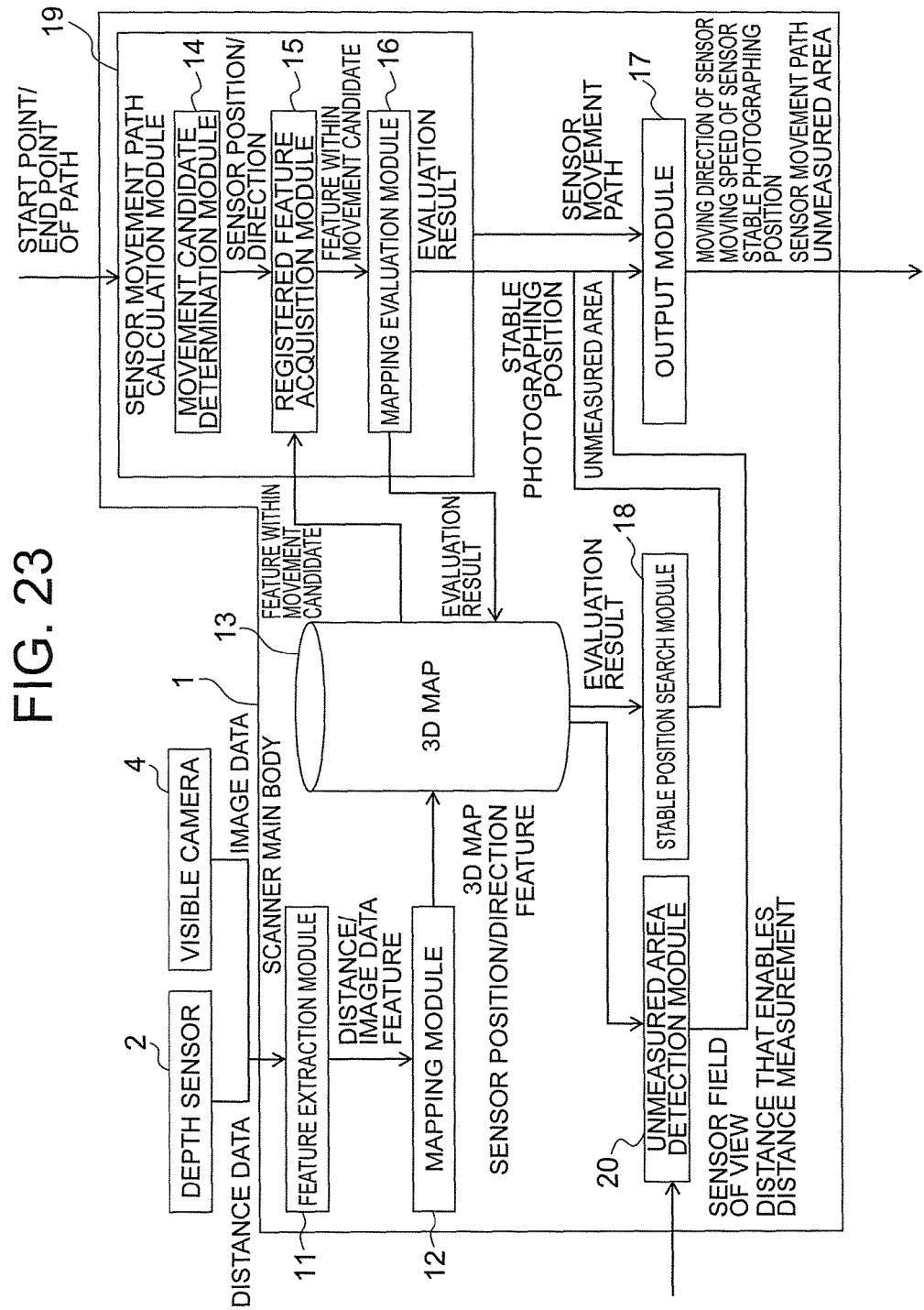
FIG. 23 is a block diagram for illustrating a three-dimensional scanner according to a sixth embodiment of the present invention.

Next, FIG. 23 is a block diagram for illustrating a three-dimensional scanner according to a sixth embodiment of the present invention. The scanner main body 1 according to the sixth embodiment further includes an unmeasured area detection module 20 configured to detect an unmeasured area in the three-dimensional map being created.

The unmeasured area detection module 20 uses the three-dimensional map, the sensor position/direction, a sensor viewing angle, and a distance that enables the distance measurement to calculate a three-dimensional area that has been observed by the depth sensor 2 and the visible camera 4, and detects an area that has not been observed as an unmeasured area.

The output module 17 presents the retrieved unmeasured area to the user. As an example of a method of displaying the unmeasured area on the display 1a, there is a method of displaying the unmeasured area by the frame portion 1d of FIG. 10. All other configurations and operations are similar or identical to the fifth embodiment.

Figure 24:
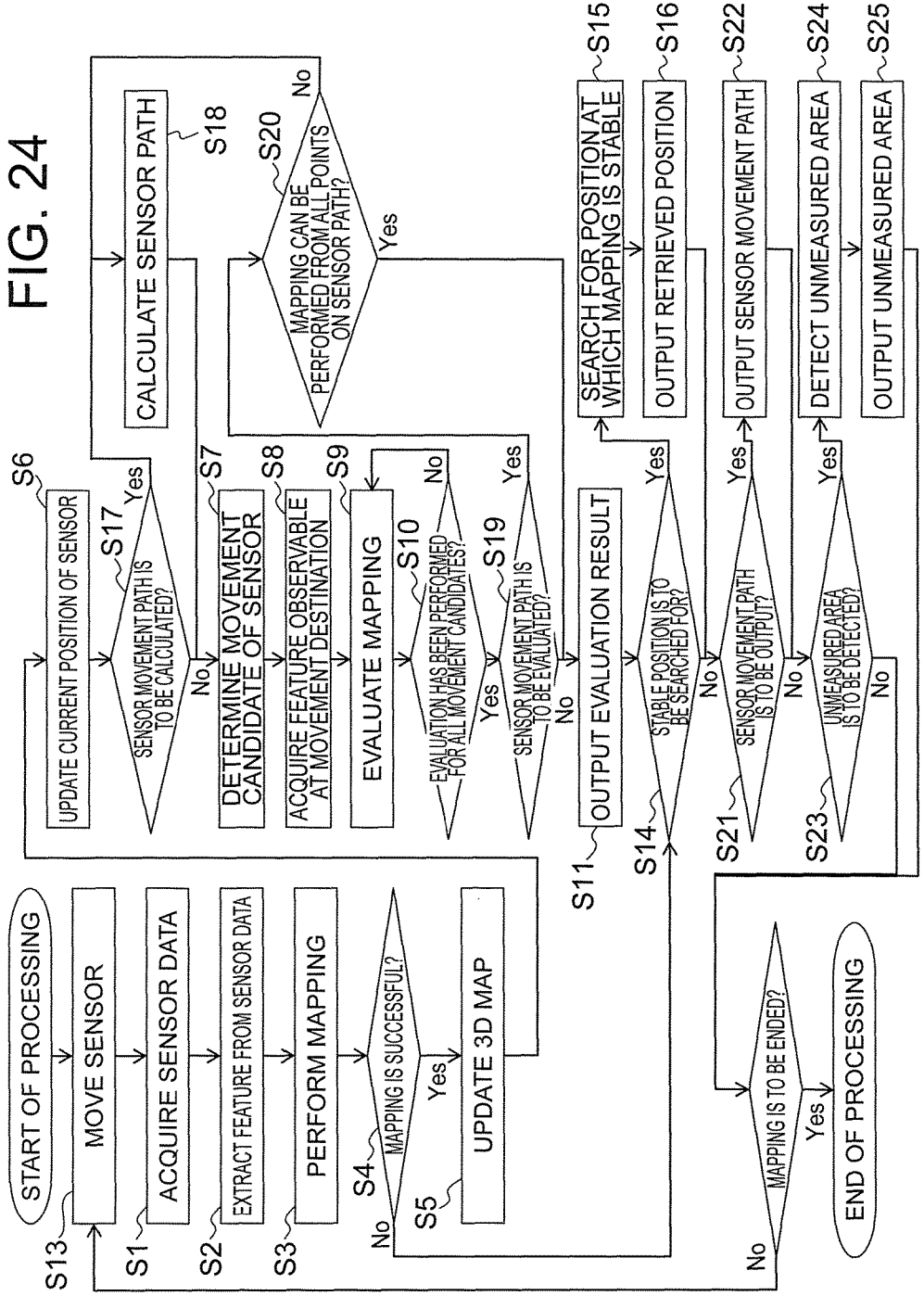
FIG. 24 is a flow chart for illustrating an operation of a scanner main body of FIG. 23.

FIG. 24 is a flow chart for illustrating an operation of the scanner main body 1 of FIG. 23. The scanner main body 1 according to the sixth embodiment determines whether or not to present the sensor movement path (Step S21), and then determines whether or not to detect an unmeasured area (Step S23). When determining that an unmeasured area is required to be detected, the scanner main body 1 detects an unmeasured area (Step S24), and presents the unmeasured area to the user (Step S25).

In addition to the effects of the fifth embodiment, the above-mentioned three-dimensional scanner and measurement assistance processing method for the same produce such an effect that it is possible to easily examine which part of an object to be scanned has not been measured, which can prevent such rework as to redo the measurement found to have been skipped after the scanning.

Figure 25:
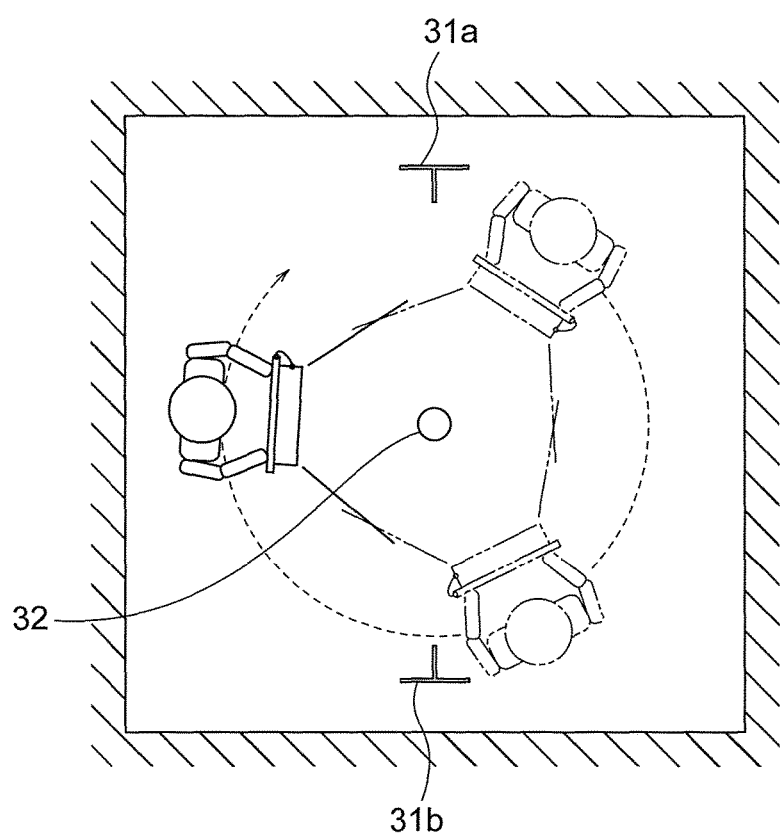
FIG. 25 is a plan view for illustrating how a three-dimensional map of an inside of a pit of the elevator shaft is created through use of the three-dimensional scanner according to each of the first to sixth embodiments.

FIG. 25 is a plan view for illustrating how the three-dimensional map of the inside of a pit of the elevator shaft is created through use of the three-dimensional scanner according to each of the first to sixth embodiments. In the pit, a pair of guide rails 31a and 31b for guiding the ascending and descending of a car (not shown), a buffer 32, and the like are installed.

In the inside of the pit or other such environment, there are insufficient texture and shape features, and there are relatively few features required for the mapping. Therefore, there is a probability that it may be impossible to perform the mapping depending on the path of the depth sensor 2.

Against this backdrop, with the three-dimensional scanner according to each of the first to sixth embodiments, information is presented to the user so that scanning is performed along a sensor movement path that enables mapping, to thereby be able to prevent such rework as to redo the scanning due to a failure in mapping. In addition, the detection of an unmeasured area allows the user to know a part that has not been scanned yet, to thereby prevent rework due to the missed measurement as well.

Further, when the inside of the pit or other such narrow space (for example, about 2 m square is assumed) is measured, a distance from the depth sensor 2 to the measurement target tends to be short. When the distance is short, the number of features observed in the sensor field of view is relatively small, which leads to a fear that the stability of the mapping may deteriorate. In the mapping evaluation, the evaluation value becomes more satisfactory as the number of features becomes larger. Therefore, in order to scan a narrow space so as to obtain a sensor posture with a satisfactory evaluation value, the user is guided to perform the measurement along a circle while maintaining a posture for measuring an opposite hoistway wall across the center of the space.

Figure 26:
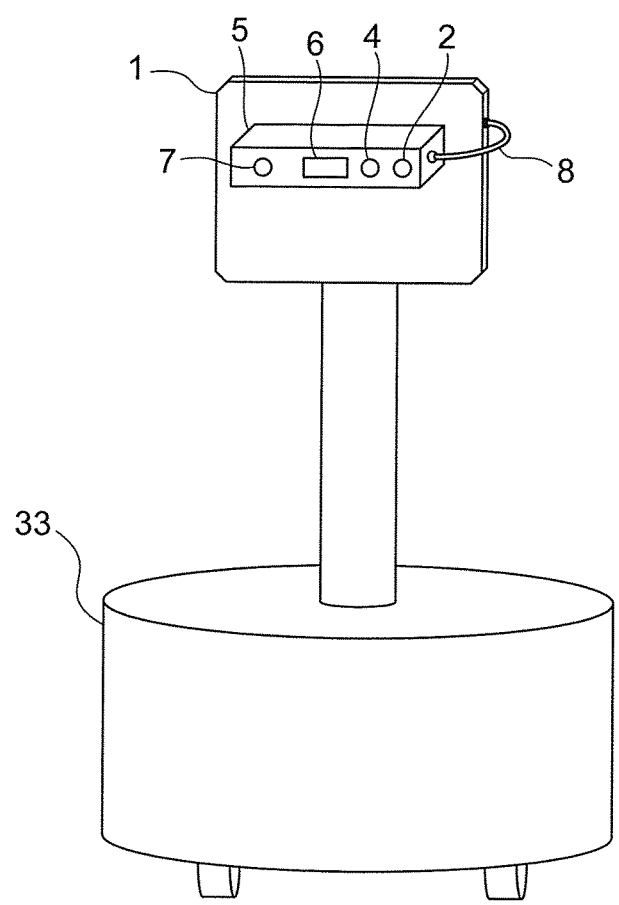
FIG. 26 is a perspective view for illustrating a state under which the three-dimensional scanner according to each of the first to sixth embodiments is mounted to a mobile robot.

Next, FIG. 26 is a perspective view for illustrating a state under which the three-dimensional scanner according to each of the first to sixth embodiments is mounted to a mobile robot 33, which is of an autonomous traveling type and a wheeled type. In this manner, the three-dimensional scanner is mounted to the mobile robot 33, to thereby be able to generate the three-dimensional map of the surrounding environment of the mobile robot 33.

In the generation of a three-dimensional map through use of the mobile robot 33, the robot is required to be able to constantly recognize where the robot itself is positioned in the three-dimensional map (self position). However, when the mapping fails, the self position becomes unclear, which leads to a failure of the system. Against this backdrop, the three-dimensional scanner according to each of the first to sixth embodiments performs the mapping evaluation in advance before the subsequent movement is started, which allows the mobile robot 33 to select a path that prevents the mapping from failing.

Further, by detecting an unmeasured area, it is possible to move to a place from which the measurement has not been performed to update the three-dimensional map. With this configuration, it is possible to automatically and efficiently construct a three-dimensional map without a missing part.

In the first to sixth embodiments, the functions of the scanner main body 1 may be separately executed by two or more computers or electronic circuits.

There is no particular limitation imposed on the measurement target, and the present invention can also be applied to three-dimensional measurement other than that of the elevator shaft.

The invention claimed is:

1. A three-dimensional scanner, comprising:
a depth sensor capable of acquiring measurement data on a distance to a measurement target as a set of points in a three-dimensional space; and
a scanner main body configured to:
extract features from a plurality of pieces of measurement data acquired by the depth sensor; and
create a three-dimensional map by superimposing the extracted features on one another,
wherein the scanner main body is configured to:
calculate a position and direction of the depth sensor;
determine a movement candidate, which is a candidate for a position and direction to/in which the depth sensor is to be moved next;
acquire a feature within the movement candidate, which is the feature observable by the depth sensor from the movement candidate;
evaluate stability of mapping performed from the movement candidate through use of the feature within the movement candidate; and
present at least any one of a moving direction or moving speed of the depth sensor to a user based on an evaluation result.

2. The three-dimensional scanner according to claim 1, wherein the scanner main body includes a display, and
wherein the scanner main body is configured to display, on the display, a current situation of measurement performed by the depth sensor and a presentation content relating to movement of the depth sensor together.

3. The three-dimensional scanner according to claim 2, wherein the scanner main body is configured to:
display the moving direction of the depth sensor on the display in a form of a direction of an arrow; and
display the moving speed of the depth sensor on the display in a form of a length of the arrow.

4. The three-dimensional scanner according to claim 2, wherein the scanner main body is configured to display, on the display, the current situation of measurement performed by the depth sensor and the three-dimensional map being created side by side.

5. The three-dimensional scanner according to claim 2, wherein the scanner main body is configured to display a direction to a mapped area and a direction to an unmeasured area so as to be distinguished from each other in a frame portion in a periphery of an area in which the current situation of measurement performed by the depth sensor is displayed.

6. The three-dimensional scanner according to claim 1, wherein the scanner main body is configured to:
search the three-dimensional map being created for a photographing position at which the mapping is stable based on an evaluation function obtained in consideration of a magnitude of an evaluation value of the mapping and a degree of closeness to a current position; and
present the photographing position to the user.

7. The three-dimensional scanner according to claim 1, wherein the scanner main body is configured to:
calculate a path of the depth sensor between freely-selected positions in the three-dimensional map being created, the path enabling the depth sensor to move without interruption of the mapping; and
present the path to the user.

8. The three-dimensional scanner according to claim 1, wherein the scanner main body is configured to:
detect an unmeasured area in the three-dimensional map being created; and
present the unmeasured area to the user.

9. The three-dimensional scanner according to claim 1, further comprising a visible camera capable of acquiring a two-dimensional image of the measurement target,
wherein the scanner main body is configured to:
extract a visual feature from a plurality of pieces of image data obtained from the visible camera; and
use the visual feature for the mapping.

10. The three-dimensional scanner according to claim 1, further comprising an illumination device configured to apply light to the measurement target.

11. The three-dimensional scanner according to claim 1, further comprising a projector configured to project a pattern onto the measurement target,
wherein the depth sensor is configured to photograph the projected pattern to detect distance data by an active stereo method.

12. A measurement assistance processing method for a three-dimensional scanner,
the three-dimensional scanner including:
a depth sensor capable of acquiring measurement data on a distance to a measurement target as a set of points in a three-dimensional space; and
a scanner main body configured to:
extract features from a plurality of pieces of measurement data acquired by the depth sensor; and
create a three-dimensional map by superimposing the extracted features on one another,
the measurement assistance processing method being a processing method for assisting three-dimensional measurement by the scanner main body of the three-dimensional scanner,
the measurement assistance processing method comprising the steps of:
calculating a position and direction of the depth sensor;
determining a movement candidate, which is a candidate for a position and direction to/in which the depth sensor is to be moved next;
acquiring a feature within the movement candidate, which is the feature observable by the depth sensor from the movement candidate;
evaluating stability of mapping performed from the movement candidate through use of the feature within the movement candidate; and
presenting at least any one of a moving direction or moving speed of the depth sensor to a user based on an evaluation result.

13. The measurement assistance processing method for a three-dimensional scanner according to claim 12, further comprising a step of displaying, on a display, a current situation of measurement performed by the depth sensor and a presentation content relating to movement of the depth sensor together.

14. The measurement assistance processing method for a three-dimensional scanner according to claim 13, wherein the step of displaying a current situation of measurement performed by the depth sensor includes displaying a direction to a mapped area and a direction to an unmeasured area so as to be distinguished from each other.

15. The measurement assistance processing method for a three-dimensional scanner according to claim 12, further comprising the steps of:
   searching the three-dimensional map being created for a photographing position at which the mapping is stable based on an evaluation function obtained in consideration of a magnitude of an evaluation value of the mapping and a degree of closeness to a current position; and
   presenting the photographing position to the user.

16. The measurement assistance processing method for a three-dimensional scanner according to claim 12, further comprising the steps of:
   calculating a path of the depth sensor between freely-selected positions in the three-dimensional map being created, the path enabling the depth sensor to move without interruption of the mapping; and
   presenting the path to the user.

17. The measurement assistance processing method for a three-dimensional scanner according to claim 12, further comprising the steps of:
   detecting an unmeasured area in the three-dimensional map being created; and
   presenting the unmeasured area to the user.

* * * * *